United States Patent
Nainar et al.

(10) Patent No.: US 11,032,197 B2
(45) Date of Patent: Jun. 8, 2021

(54) REROUTE DETECTION IN SEGMENT ROUTING DATA PLANE

(71) Applicant: CISCO TECHNOLOGY, INC., San Jose, CA (US)

(72) Inventors: Nagendra Kumar Nainar, Morrisville, NC (US); Carlos M. Pignataro, Raleigh, NC (US); Peter Psenak, Bratislava (SK)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/266,498

(22) Filed: Sep. 15, 2016

(65) Prior Publication Data

US 2018/0077051 A1 Mar. 15, 2018

(51) Int. Cl.
| | |
|---|---|
| *H04L 12/741* | (2013.01) |
| *H04L 12/703* | (2013.01) |
| *H04W 24/06* | (2009.01) |
| *H04L 29/06* | (2006.01) |

(52) U.S. Cl.
CPC ............ *H04L 45/745* (2013.01); *H04L 45/28* (2013.01); *H04L 69/22* (2013.01); *H04W 24/06* (2013.01)

(58) Field of Classification Search
None
See application file for complete search history.

(56) References Cited

U.S. PATENT DOCUMENTS

| | | | | |
|---|---|---|---|---|
| 4,853,843 A | * | 8/1989 | Ecklund | G06F 16/278 |
| 5,448,718 A | * | 9/1995 | Cohn | G06F 11/1466 |
| | | | | 707/999.202 |

(Continued)

FOREIGN PATENT DOCUMENTS

| CN | 101931 548 a | 1/2010 | ............. H04L 12/24 |
|---|---|---|---|
| CN | 102132533 A | 7/2011 | ............. H04L 12/56 |

(Continued)

OTHER PUBLICATIONS

Seamless Bidirectional Forwarding Detection (S-BFD) for Segment Routing draft-akiya-bfd-seamless-sr-03.*

(Continued)

*Primary Examiner* — Christopher T Wyllie
(74) *Attorney, Agent, or Firm* — Campbell Stephenson LLP

(57) ABSTRACT

Methods and systems are disclosed for detection of reroute occurrences in segment routing enabled networks. In one embodiment, a method includes receiving, at a first node in a communications network, a test message comprising a header, where the header comprises one or more segment identifiers. This embodiment of the method further includes detecting a first indicator of a rerouted test path for the message and sending an outgoing message to a node determined using the header, where sending the outgoing message comprises including in the outgoing message a second indicator that the test message has been rerouted. An embodiment of a system includes a network interface adapted for data communication with one or more nodes of a communications network and a processor operably coupled to the network interface and adapted to implement an embodiment of the method.

19 Claims, 11 Drawing Sheets

(56) References Cited

U.S. PATENT DOCUMENTS

| | | | |
|---|---|---|---|
| 5,654,695 A * | 8/1997 | Olnowich | H03M 9/00 340/2.23 |
| 5,699,521 A | 12/1997 | Iizuka | |
| 5,764,624 A | 6/1998 | Endo | 370/218 |
| 6,032,197 A | 2/2000 | Birdwell | 709/216 |
| 6,147,976 A | 11/2000 | Shand | 370/254 |
| 6,374,303 B1 | 4/2002 | Armitage | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/6 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/254 |
| 7,373,401 B1 | 5/2008 | Azad | 370/236.2 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,568,047 B1 | 7/2009 | Aysan | |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,903,554 B1 | 3/2011 | Manur | |
| 7,940,695 B1 | 5/2011 | Bahadur et al. | 370/254 |
| 7,970,929 B1 | 6/2011 | Mahalingaiah | |
| 7,983,174 B1 | 7/2011 | Monaghan et al. | 370/242 |
| 8,064,441 B2 | 11/2011 | Wijnands et al. | 370/389 |
| 8,121,126 B1 | 2/2012 | Moisand | |
| 8,131,126 B2 | 3/2012 | Kowalczyk | |
| 8,339,973 B1 | 12/2012 | Pichumani | 370/248 |
| 8,374,164 B2 | 2/2013 | Nadeau et al. | 370/351 |
| 8,422,514 B1 | 4/2013 | Kothari et al. | 370/466 |
| 8,542,706 B2 | 9/2013 | Wang et al. | 370/474 |
| 8,611,335 B1 | 12/2013 | Wu | 370/351 |
| 8,619,817 B1 | 12/2013 | Everson | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,848,728 B1 | 9/2014 | Revah | 370/386 |
| 8,923,292 B2 | 12/2014 | Friskney | |
| 8,953,590 B1 | 2/2015 | Aggarwal | 370/389 |
| 9,036,474 B2 | 5/2015 | Dibirdi et al. | 370/235 |
| 9,049,233 B2 | 6/2015 | Frost et al. | |
| 9,094,337 B2 | 7/2015 | Bragg | |
| 9,094,344 B2 | 7/2015 | Boutros et al. | 370/225 |
| 9,112,734 B2 | 8/2015 | Edwards et al. | |
| 9,118,572 B2 | 8/2015 | Sajassi | |
| 9,300,563 B2 | 3/2016 | Rahman | 709/230 |
| 9,319,312 B2 | 4/2016 | Filsfils et al. | 709/223 |
| 9,660,897 B1 | 5/2017 | Gredler | |
| 9,749,187 B2 * | 8/2017 | Filsfils | H04L 49/608 |
| 9,749,227 B2 | 8/2017 | Frost et al. | |
| 9,794,148 B1 * | 10/2017 | Ramachandran | H04L 45/22 |
| 10,805,204 B1 * | 10/2020 | Morris | H04L 45/24 |
| 10,880,203 B2 * | 12/2020 | Nainar | H04L 45/34 |
| 2001/0037401 A1 | 11/2001 | Soumiya | 709/232 |
| 2001/0055311 A1 | 12/2001 | Trachewsky | 370/445 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0133412 A1 | 7/2003 | Iyer | 370/235 |
| 2003/0142674 A1 | 7/2003 | Casey | 370/393 |
| 2003/0142685 A1 | 7/2003 | Bare | 370/410 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0190527 A1 | 9/2004 | Okura | 370/395.2 |
| 2004/0196840 A1 | 10/2004 | Amrutur et al. | 370/389 |
| 2004/0202158 A1 | 10/2004 | Takeno | 379/389 |
| 2004/0240442 A1 | 12/2004 | Grimminger | 379/389 |
| 2005/0073958 A1 | 4/2005 | Atlas | 370/238 |
| 2005/0105515 A1 | 5/2005 | Reed | 370/360 |
| 2005/0157724 A1 | 7/2005 | Montuno | 370/392 |
| 2005/0213513 A1 | 9/2005 | Ngo | 370/254 |
| 2005/0259655 A1 | 11/2005 | Cuervo et al. | 370/392 |
| 2005/0286411 A1 * | 12/2005 | Alicherry | H04L 41/145 370/216 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0146696 A1 | 7/2006 | Li | 370/218 |
| 2006/0187817 A1 | 8/2006 | Charzinski | 370/216 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0041345 A1 | 2/2007 | Yarvis | |
| 2007/0053342 A1 | 3/2007 | Sierecki | 370/351 |
| 2007/0058638 A1 | 3/2007 | Guichard et al. | 370/395.31 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0049610 A1 | 2/2008 | Linwong | 370/225 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Goode | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0212465 A1 | 9/2008 | Yan | 370/225 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2008/0316916 A1 | 12/2008 | Tazzari | 370/216 |
| 2009/0041038 A1 | 2/2009 | Martini et al. | 370/401 |
| 2009/0049194 A1 | 2/2009 | Csaszar | 709/242 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2009/0196289 A1 | 8/2009 | Shankar | 370/392 |
| 2009/0247157 A1 | 10/2009 | Yoon et al. | 455/434 |
| 2009/0296710 A1 | 12/2009 | Agrawal | 370/392 |
| 2010/0060844 A1 | 3/2010 | Sawatari et al. | 709/241 |
| 2010/0063983 A1 | 3/2010 | Groarke et al. | 707/803 |
| 2010/0088717 A1 | 4/2010 | Candelore et al. | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0272110 A1 | 10/2010 | Allan et al. | 370/395.53 |
| 2010/0284309 A1 | 11/2010 | Allan et al. | 370/256 |
| 2010/0329153 A1 | 12/2010 | Xu | |
| 2011/0021193 A1 | 1/2011 | Hong | |
| 2011/0063986 A1 | 3/2011 | Denecheau | 370/248 |
| 2011/0090913 A1 | 4/2011 | Kim | 370/400 |
| 2011/0149973 A1 | 6/2011 | Esteve Rothenberg | 370/392 |
| 2011/0228780 A1 | 9/2011 | Ashwood-Smith | 370/392 |
| 2011/0261722 A1 | 10/2011 | Awano | 370/254 |
| 2011/0268114 A1 | 11/2011 | Wijnands et al. | 370/389 |
| 2011/0280123 A1 | 11/2011 | Wijnands et al. | 370/228 |

(56) References Cited

U.S. PATENT DOCUMENTS

| | | |
|---|---|---|
| 2011/0286452 A1 | 11/2011 | Balus .......................... 370/390 |
| 2012/0044944 A1 | 2/2012 | Kotha et al. ................. 370/401 |
| 2012/0063526 A1 | 3/2012 | Xiao .......................... 375/259 |
| 2012/0069740 A1 | 3/2012 | Lu et al. ..................... 370/238 |
| 2012/0069845 A1 | 3/2012 | Carney et al. ............... 370/392 |
| 2012/0075988 A1 | 3/2012 | Lu .............................. 370/218 |
| 2012/0082034 A1 | 4/2012 | Vasseur ....................... 370/235 |
| 2012/0099861 A1 | 4/2012 | Zheng .......................... 398/45 |
| 2012/0106560 A1 | 5/2012 | Gumaste ..................... 370/401 |
| 2012/0120808 A1 | 5/2012 | Nandagopal et al. ........ 370/238 |
| 2012/0140679 A1* | 6/2012 | Inaba .................. H04L 12/437 370/258 |
| 2012/0179796 A1 | 7/2012 | Nagaraj ....................... 709/223 |
| 2012/0213225 A1 | 8/2012 | Subramanian et al. ...... 370/392 |
| 2012/0218884 A1 | 8/2012 | Kini ............................ 370/228 |
| 2012/0236860 A1 | 9/2012 | Kompella .................... 370/392 |
| 2012/0243539 A1 | 9/2012 | Keesara ....................... 370/392 |
| 2012/0287818 A1 | 11/2012 | Corti et al. .................. 370/254 |
| 2012/0307629 A1 | 12/2012 | Vasseur ....................... 370/228 |
| 2013/0003728 A1 | 1/2013 | Kwong et al. ............... 370/389 |
| 2013/0051237 A1 | 2/2013 | Ong ............................. 370/237 |
| 2013/0077476 A1 | 3/2013 | Enyedi ......................... 370/225 |
| 2013/0077624 A1 | 3/2013 | Keesara et al. .............. 370/390 |
| 2013/0077625 A1 | 3/2013 | Khera .......................... 370/390 |
| 2013/0077626 A1 | 3/2013 | Keesara et al. .............. 370/390 |
| 2013/0114402 A1* | 5/2013 | Ould-Brahim .......... H04L 41/06 370/225 |
| 2013/0142052 A1 | 6/2013 | Burbidge ..................... 370/242 |
| 2013/0188634 A1 | 7/2013 | Magee ......................... 370/389 |
| 2013/0219034 A1 | 8/2013 | Wang et al. .................. 709/222 |
| 2013/0258842 A1 | 10/2013 | Mizutani ..................... 370/228 |
| 2013/0266012 A1 | 10/2013 | Dutta et al. .................. 370/392 |
| 2013/0266013 A1 | 10/2013 | Dutta et al. .................. 370/392 |
| 2013/0308948 A1 | 11/2013 | Swinkels |
| 2013/0322449 A1 | 12/2013 | Hwang |
| 2013/0343204 A1 | 12/2013 | Geib et al. ................... 370/248 |
| 2014/0044036 A1 | 2/2014 | Kim |
| 2014/0160925 A1 | 6/2014 | Xu ............................... 370/235 |
| 2014/0169370 A1 | 6/2014 | Filsfils et al. ................ 370/392 |
| 2014/0177638 A1 | 6/2014 | Bragg et al. ............... 370/395.3 |
| 2014/0189156 A1 | 7/2014 | Morris ......................... 709/238 |
| 2014/0192677 A1 | 7/2014 | Chew ........................... 370/254 |
| 2014/0254596 A1 | 9/2014 | Filsfils et al. ................ 370/392 |
| 2014/0269266 A1* | 9/2014 | Filsfils .................... H04L 43/50 370/228 |
| 2014/0269421 A1 | 9/2014 | Previdi et al. ............... 370/254 |
| 2014/0269422 A1 | 9/2014 | Filsfils et al. ................ 370/254 |
| 2014/0269698 A1 | 9/2014 | Filsfils et al. ................ 370/389 |
| 2014/0269699 A1 | 9/2014 | Filsfils et al. ................ 370/389 |
| 2014/0269721 A1 | 9/2014 | Bashandy et al. ........... 370/392 |
| 2014/0269725 A1 | 9/2014 | Filsfils et al. ................ 370/392 |
| 2014/0269727 A1* | 9/2014 | Filsfils .................... H04L 45/54 370/392 |
| 2014/0286195 A1 | 9/2014 | Fedyk .......................... 370/254 |
| 2014/0317259 A1 | 10/2014 | Previdi et al. ............... 709/223 |
| 2014/0369356 A1 | 12/2014 | Bryant et al. ................ 370/392 |
| 2015/0023328 A1 | 1/2015 | Thubert et al. .............. 370/336 |
| 2015/0030020 A1 | 1/2015 | Kini ............................. 370/389 |
| 2015/0109902 A1* | 4/2015 | Kumar ................ H04L 41/0668 370/219 |
| 2015/0249587 A1 | 9/2015 | Kozat .......................... 370/222 |
| 2015/0256456 A1* | 9/2015 | Previdi .................. H04L 69/22 370/392 |
| 2015/0263940 A1 | 9/2015 | Kini .......................... 370/236.2 |
| 2015/0326675 A1 | 11/2015 | Kini ............................. 709/224 |
| 2015/0334006 A1 | 11/2015 | Shao |
| 2015/0381406 A1 | 12/2015 | Francois ...................... 370/218 |
| 2016/0006614 A1 | 1/2016 | Zhao ............................ 370/254 |
| 2016/0021000 A1 | 1/2016 | Previdi et al. ............... 370/389 |
| 2016/0034209 A1 | 2/2016 | Nanduri et al. ............. 711/114 |
| 2016/0034370 A1 | 2/2016 | Nanduri et al. ............ 714/6.22 |
| 2016/0119159 A1 | 4/2016 | Zhao ............................ 370/390 |
| 2016/0127142 A1 | 5/2016 | Tian ............................. 370/390 |
| 2016/0173366 A1* | 6/2016 | Saad ....................... H04L 45/20 370/218 |
| 2016/0191372 A1 | 6/2016 | Zhang .......................... 370/390 |
| 2016/0254987 A1 | 9/2016 | Eckert et al. ................ 370/390 |
| 2016/0254988 A1 | 9/2016 | Eckert et al. ................ 370/390 |
| 2016/0254991 A1 | 9/2016 | Eckert et al. ................ 370/225 |
| 2016/0352654 A1 | 12/2016 | Filsfils et al. ................ 370/392 |
| 2017/0019330 A1 | 1/2017 | Filsfils et al. ................ 370/389 |
| 2017/0104673 A1 | 4/2017 | Bashandy et al. ........... 370/392 |
| 2017/0111277 A1 | 4/2017 | Previdi et al. ............... 370/392 |
| 2017/0346718 A1 | 11/2017 | Psenak et al. ............... 370/235 |
| 2017/0346737 A1 | 11/2017 | Previdi et al. ............... 370/392 |
| 2017/0366453 A1 | 12/2017 | Previdi et al. ............... 370/392 |
| 2018/0083871 A1 | 3/2018 | Filsfils ......................... 370/392 |
| 2020/0358694 A1 | 11/2020 | Psenak et al. |
| 2020/0382379 A1 | 12/2020 | Bashandy |

FOREIGN PATENT DOCUMENTS

| | | | | |
|---|---|---|---|---|
| CN | 102299852 A | 11/2011 | ............ | H04L 12/56 |
| CN | 102498694 A | 6/2012 | ............ | H04L 12/56 |
| CN | 102714625 A | 10/2012 | ............ | H04L 12/56 |
| WO | WO 2008/012295 A1 | 2/2008 | | |

OTHER PUBLICATIONS

Psenak, Peter et al., "Enforcing Strict Shortest Path Forwarding Using Strict Segment Identifier"; U.S. Appl. No. 16/384,219, filed Apr. 15, 2019; consisting of Specification, Claims, Abstract, and Drawings (48 pp.).

Eckert, Toerless et al., "Traffic Engineering for Bit Indexed Explicit Replication"; U.S. Appl. No. 16/457,339, filed Jun. 28, 2019; consisting of Specification, Claims, Abstract, and Drawings (88 pages).

Previdi, Stefano et al., "Segment Routing Extension Headers"; U.S. Appl. No. 16/525,000, filed Jul. 29, 2019; consisting of Specification, Claims, Abstract, and Drawings (57 pages).

Bashandy, Ahmed R. et al., "Segment Routing Over Label Distribution Protocol", U.S. Appl. No. 16/367,869, filed Mar. 28, 2019; consisting of Specification, Claims, Abstract, and Drawings (37 pages).

Rosen, E. et al., Cisco Systems, Inc., "Multiprotocol Label Switching Architecture", Network Working Group, Request for Comments: 3031; Jan. 2001, pp. 1-61.

Psenak, Peter et al., "Enforcing Strict Shortest Path Forwarding Using Strict Segment Identifiers"; U.S. Appl. No. 15/165,794, filed May 26, 2016; consisting of Specification, Claims, Abstract, and Drawings (52 pages).

Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.

Alcatel-Lucent, "Segment Routing and Path Computation Element—Using Traffic Engineering to Optimize Path Placement and Efficiency in IP/MPLS Networks"; Technology White Paper; 2015; 28 pages.

Awduche, Daniel O., et al., "RSVP-TE: Extensions to RSVP for LSP Tunnels," Network Working Group, Internet-Draft, Aug. 2000, pp. 1-12.

Awduche, Daniel O., et al., "RSVP-TE: Extensions to RSVP for LSP Tunnels," Network Working Group, Request for Comments 3209, Dec. 2001, pp. 1-61.

Awduche, D. et al., "Requirements for Traffic Engineering Over MPLS"; Network Working Group; Request for Comments: 2702; Sep. 1999; pp. 1-29.

Awduche, D. et al., "Overview and Principles of Internet Traffic Engineering"; Network Working Group; Request for Comments: 3272; May 2002; pp. 1-71.

Backes, P. and Rudiger Geib, "Deutsche Telekom AG's Statement About IPR Related to Draft-Geig-Spring-OAM-Usecase-01," Feb. 5, 2014, pp. 1-2.

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

(56) References Cited

OTHER PUBLICATIONS

Bryant, S., et al., Cisco Systems, "Remote LFA FRR," draft-ietf-rtgwg-remote-lfa-04, Network Working Group, Internet-Draft, Nov. 22, 2013, pp. 1-24.

Cisco Systems, Inc., "Introduction to Intermediate System-to-Intermediate System Protocol," published 1992-2002; pp. 1-25.

Crabbe, E., et al., "PCEP Extensions for MPLS-TE LSP Protection With Stateful PCE Draft-Crabbe-PCE-Stateful-PCE-Protection-00," Network Working Group, Internet-Draft, Oct. 2012, pp. 1-12.

Crabbe, E., et al., Stateful Pce Extensions for MPLS-TE LSPs, draft-crabbe-pce-stateful-pce-mpls-te-00; Network Working Group, Internet-Draft, Oct. 15, 2012, pp. 1-15.

Deering, S., et al., Cisco, Internet Protocol, Version 6 (IPv6) Specification, Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet -Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet -Draft, Jul. 5, 2015, pp. 1-23.

Farrel, A., et al., Old Dog Consulting, A Path Computation Element (PCE)-Based Architecture, Network Working Group, Request for Comments 4655, Aug. 2006, pp. 1-80.

Farrel, A., et al., Old Dog Consulting, Inter-Domain MPLS and GMPLS Traffic Engineering—Resource Reservation Protocol-Traffic Engineering (RSVP-TE) Extensions, Network Working Group, Request for Comments 5151, Feb. 2008, pp. 1-25.

Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.

Filsfils, C., et al., Cisco Systems, Inc., "Segment Routing Architecture," draft-filsfils-rtgwg-segment-routing-00, Jun. 28, 2013; pp. 1-28.

Filsfils, C., et al., Cisco Systems, Inc., "Segment Routing Architecture"; draft-filsfils-rtgwg-segment-routing-01, Network Working Group, Internet-Draft, Oct. 21, 2013, pp. 1-28.

Filsfils, C. et al., Cisco Systems, Inc., "Segment Routing Interoperability with LDP"; draft-filsfils-spring-segment-routing-ldp-interop-01.txt; Apr. 18, 2014, pp. 1-16.

Filsfils, C. et al., "Segment Routing Architecture"; draft-ietf-spring-segment-routing-07; Network Working Group, Internet-Draft; Dec. 15, 2015; pp. 1-24.

Filsfils, C. et al., "Segment Routing Use Cases", draft-filsfils-rtgwg-segment-routing-use-cases-02; Network Working Group; Internet-Draft; Oct. 21, 2013; pp. 1-36.

Filsfils, C. et al.; "Segment Routing Use Cases"; draft-filsfils-rtgwg-segment-routing-use-cases-01; Network Working Group; Internet-Draft; Jul. 14, 2013; pp. 1-46.

Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.

Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.

Frost, D., et al., Cisco Systems, Inc., "MPLS Generic Associated Channel (G-Ach) Advertisement Protocol," Request for Comments 7212, Jun. 2014, pp. 1-23.

Geib, R., "Segment Routing Based OAM Use Case," IETF 87, Berlin, Jul./Aug. 2013, pp. 1-3.

Geib, R., Deutsch Telekom, "Use Case for a Scalable and Topology Aware MPLS data plan monitoring System," draft-geib-spring-oam-usecase-00; Internet-Draft, Oct. 17, 2013, pp. 1-7.

Geib, R., Deutsch Telekom, "Use Case for a Scalable and Topology Aware MPLS Data Plan Monitoring System," draft-geib-spring-oam-usecase-01; Internet-Draft, Feb. 5, 2014, pp. 1-10.

Gredler, H., et al., Juniper Networks, Inc., "Advertising MPLS Labels in IS-IS draft-gredler-isis-label-advertisement-00," Internet-Draft; Apr. 5, 2013; pp. 1-13.

Gredler, H. et al., hannes@juniper.net, IETF87, Berlin, "Advertising MPLS LSPs in the IGP," draft-gredler-ospf-label-advertisement, May 21, 2013; pp. 1-14.

Guilbaud, Nicolas and Ross Cartlidge, "Google—Localizing Packet Loss in a Large Complex Network," Feb. 5, 2013, pp. 1-43.

Imaizumi, H., et al.; Networks, 2005; "FMEHR: An Alternative Approach to Multi-Path Forwarding on Packed Switched Networks," pp. 196-201.

Kompella, K. et al, Juniper Networks, "Label Switched Paths (LSP) Hierarchy with Generalized Multi-Protocol Label Switching (GMPLS) Traffic Enginering (TE)," Network Working Group, Request for Comments 4206, Oct. 2005, pp. 1-14.

Kompella, K., et al., Juniper Networks, Inc., "Detecting Multi-Protocol Label Switched (MPLS) Data Plane Failures," Network Working Group, Request for Comments 4379, Feb. 2006, pp. 1-50.

Kompella, K. et al., Juniper Networks,"Virtual Private LAN Service (VPLS) Using BGP for Auto-Discovery and Signaling," Network Working Group, Request for Comments 4761, Jan. 2007, pp. 1-28.

Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.

Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.

Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.

Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.

Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.

Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.

Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.

Raszuk, R., NTT I3, "MPLS Domain Wide Labels," draft-raszuk-mpls-domain-wide-labels-00, MPLS Working Group, Internet-Draft, Jul. 14, 2013, pp. 1-6.

Rosen, E. et al., Cisco Systems, Inc., "BGP/MPLS VPNs", Network Working Group, Request for Comments: 2547; Mar. 1999, pp. 1-26.

Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.

Li, T., et al., Redback Networks, Inc., "IS-IS Extensions for Traffic Engineering," Network Working Group, Request for Comments 5305, Oct. 2008, 17 pages.

Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.

Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

Vasseur, JP, et al.; Cisco Systems, Inc. Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.

Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.

Atlas, A. et al., "Basic Specification for IP Fast Reroute: Loop-Free Alternates"; Network Working Group; Request for Comments: 5286: Sep. 2008; 31 pages.

(56) References Cited

OTHER PUBLICATIONS

Katz, D. et al., "Bidirectional Forwarding Detection (BFD)"; Internet Engineering Task Force (IETF); Request for Comments: 5880: Jun. 2010; 49 pages.

Katz, D. et al., "Bidirectional Forwarding Detection (BFD) for Multihop Paths"; Internet Engineering Task Force (IETF); Request for Comments: 5883: Jun. 2010; 6 pages.

Aggarwal, R. et al., "Bidirectional Forwarding Detection (BFD) for MPLS Label Switched Paths (LSPs)"; Internet Engineering Task Force (IETF); Request for Comments: 5884: Jun. 2010; 12 pages.

Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.

Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.

Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.

Akiya, N. et al., "Seamless Bidirectional Forwarding Detection (BFD) for Segment Routing (SR)"; draft-akiya-bfd-seamless-sr-03; Internet Engineering Task Force; Internet-Draft; Aug. 23, 2014; 7 pages.

Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.

Akiya, N., "Segment Routing Implications on BFD"; Sep. 9, 2013; 3 pages.

Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.

Filsfils, C. et al., "Segment Routing with MPLS Data Plane", draft-ietf-spring-segment-routing-mpls-05; Network Working Group; Internet-Draft; Jul. 6, 2016; 15 pages.

Kumar, N. et al, "OAM Requirements for Segment Routing Network"; draft-kumar-spring-sr-oam-requirement-00; Spring; Internet-Draft; Feb. 14, 2014; 6 pages.

Kumar, N. et al, "OAM Requirements for Segment Routing Network"; draft-kumar-spring-sr-oam-requirement-01;Spring; Internet-Draft; Jul. 1, 2014; 6 pages.

Kumar, N. et al, "Oam Requirements for Segment Routing Network"; draft-kumar-spring-sr-oam-requirement-02; Spring; Internet-Draft; Dec. 31, 2014; 6 pages.

Kumar, N. et al, "Oam Requirements for Segment Routing Network"; draft-kumar-spring-sr-oam-requirement-03; Spring; Internet-Draft; Mar. 9, 2015; 6 pages.

Kumar, N. et al., "Label Switched Path (LSP) Ping/Trace for Segment Routing Networks Using MPLS Dataplane", draft-ietf-mpls-spring-lsp-ping-00; Network Work Group; Internet Draft; May 10, 2016; 17 pages.

Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.

Pignataro, C. et al., "Seamless Bidirectional Forwarding Detection (S-BFD)"; draft-ietf-bfd-seamless-base-11; Internet Engineering Task Force; Internet-Draft; May 6, 2016; 21 pages.

Frost, Daniel C. et al., "MPLS Segment Routing"; U.S. Appl. No. 15/637,744, filed Jun. 29, 2017; consisting of Specification, Claims, Abstract, and Drawings (26 pages).

Filsfils, Clarence et al., "Seamless Segment Routing"; U.S. Appl. No. 15/639,398, filed Jun. 30, 2017; consisting of Specification, Claims, Abstract, and Drawings (31 pages).

\* cited by examiner

FIG. 3A

R2 SR Forwarding Table 302

| Segment ID | Stack Inst. | Next Hop Node |
|---|---|---|
| 16007 | NEXT [POP] | R7 |

FIG. 3B

R7 SR Forwarding Table 310

| Segment ID | Stack Inst. | Next Hop Node |
|---|---|---|
| 16006 | CONTINUE [SWAP 16006] | R4 |

FIG. 3C

R4 SR Forwarding Table 320

| Segment ID | Stack Inst. | Next Hop Node |
|---|---|---|
| 16006 | NEXT [POP] | R6 |

FIG. 4A

R2 SR Forwarding Table With Backup 402

| Segment ID | Stack Inst. | Next Hop Node |
|---|---|---|
| 16007 | NEXT [POP] | R7 |
| | CONTINUE [SWAP 16007] | R4 (b) } 404 |

FIG. 4B

R4 SR Forwarding Table With Backup 420

| Segment ID | Stack Inst. | Next Hop Node |
|---|---|---|
| 16007 | NEXT [POP] | R7 |
| | CONTINUE [SWAP 16007] | R2 (b) |
| 16006 | NEXT [POP] | R6 |
| | CONTINUE [SWAP 16006] | R5 (b) |

FIG. 4C

R5 SR Forwarding Table With Backup 430

| Segment ID | Stack Inst. | Next Hop Node |
|---|---|---|
| 16006 | NEXT [POP] | R6 |
| | CONTINUE [SWAP 16006] | R4 (b) |

| R2 SR Forwarding Table With Reroute Detection 502 |||
|---|---|---|
| Segment ID | Stack Inst. | Next Hop Node |
| 16007 | NEXT [POP] | R7 |
|  | NEXT; PUSH 17007 [SWAP 17007] | R4 (b) |
| 17007 | CONTINUE [SWAP 17007] | R7 |
|  | CONTINUE [SWAP 17007] | R4 (b) |
| 17002 | NEXT [POP] | -- |

FIG. 5A

| R7 SR Forwarding Table with Reroute Detection 510 |||
|---|---|---|
| Segment ID | Stack Inst. | Next Hop Node |
| 16006 | CONTINUE [SWAP 16006] | R4 |
| 17007 | NEXT [POP] | -- |

FIG. 5B

| R4 SR Forwarding Table With Reroute Detection 520 |||
|---|---|---|
| Segment ID | Stack Inst. | Next Hop Node |
| 16007 | NEXT [POP] | R7 |
|  | NEXT; PUSH 17007 [SWAP 17007] | R2 (b) |
| 17007 | CONTINUE [SWAP 17007] | R7 |
|  | CONTINUE [SWAP 17007] | R2 (b) |
| 16006 | NEXT [POP] | R6 |
|  | NEXT; PUSH 17006 [SWAP 17006] | R5 (b) |
| 17006 | CONTINUE [SWAP 17006] | R6 |
|  | CONTINUE [SWAP 17006] | R5 (b) |
| 17004 | NEXT [POP] | -- |

FIG. 5C

| R5 SR Forwarding Table With Reroute Detection 530 |||
|---|---|---|
| Segment ID | Stack Inst. | Next Hop Node |
| 16006 | NEXT [POP] | R6 |
|  | NEXT; PUSH 17006 [SWAP 17006] | R4 (b) |
| 17006 | CONTINUE [SWAP 17006] | R6 |
|  | CONTINUE [SWAP 17006] | R4 (b) |
| 17005 | NEXT [POP] | -- |

FIG. 5D

| R2 SR Forwarding Table With Reroute Detection--Context Segment  702 |||
|---|---|---|
| Segment ID | Stack Inst. | Next Hop Node |
| 16007 | NEXT [POP] | R7 |
|  | NEXT; PUSH 18000, 16007 [SWAP 18000; PUSH 16007] | R4 (b) |
| 18000 | NEXT [POP] | -- |

FIG. 7A

| R7 SR Forwarding Table with Reroute Detection--Context Segment  710 |||
|---|---|---|
| Segment ID | Stack Inst. | Next Hop Node |
| 16006 | CONTINUE [SWAP 16006] | R4 |
| 18000 | NEXT [POP] | -- |

FIG. 7B

| R4 SR Forwarding Table With Reroute Detection-- Context Segment  720 |||
|---|---|---|
| Segment ID | Stack Inst. | Next Hop Node |
| 16007 | NEXT [POP] | R7 |
|  | NEXT; PUSH 18000, 16007 [SWAP 18000; PUSH 16007] | R2 (b) |
| 16006 | NEXT [POP] | R6 |
|  | NEXT; PUSH 18000, 16006 [SWAP 18000; PUSH 16006] | R5 (b) |
| 18000 | NEXT [POP] | -- |

FIG. 7C

| R5 SR Forwarding Table With Reroute Detection--Context Segment  730 |||
|---|---|---|
| Segment ID | Stack Inst. | Next Hop Node |
| 16006 | NEXT [POP] | R6 |
|  | NEXT; PUSH 18000, 16006 [SWAP 18000; PUSH 16006] | R4 (b) |
| 18000 | NEXT [POP] | -- |

FIG. 7D

REROUTE DETECTION IN SEGMENT ROUTING DATA PLANE

TECHNICAL FIELD

This disclosure relates generally to networking and more particularly to detection of fast reroute occurrences.

BACKGROUND

Network nodes forward data. Network nodes may take the form of one or more routers, one or more bridges, one or more switches, one or more servers, or any other suitable communications processing device. The data is commonly formatted as messages and forwarded using forwarding tables. A message is a formatted unit of data that typically contains control information and payload data. Control information may include information that identifies sources and destinations, such as addresses, error detection codes like checksums, sequencing information, etc. Control information is typically found in message headers and trailers. Payload data is typically located between the message headers and trailers. Depending on factors such as the network level and network protocol used, a message may be formatted and/or referred to as one of various specific types such as packets, datagrams, segments, or frames.

Modern communications applications demand extreme reliability and service quality from communications networks. In some cases, service level agreements require network providers to meet specified targets for quality-of-service metrics such as error rates, bit rates, and availability. It is important for a network service provider to make sure both that transmitted data arrives at its destination and that the data arrives via a sufficiently high-quality path.

BRIEF DESCRIPTION OF THE DRAWINGS

The present disclosure may be better understood, and its numerous objects, features, and advantages made apparent to those skilled in the art by referencing the accompanying drawings.

FIGS. 3A through 3C are tables illustrating exemplary forwarding table information.

FIGS. 4A through 4C are tables illustrating exemplary forwarding table information for a network implementation including reroute protection.

FIGS. 5A through 5D are tables illustrating exemplary forwarding table information for a network implementation including detection of reroute protection use.

FIGS. 7A through 7D are tables illustrating exemplary forwarding table information for a network implementation configured for reroute detection using a backup context segment identifier.

DETAILED DESCRIPTION

Overview

Figure 1:
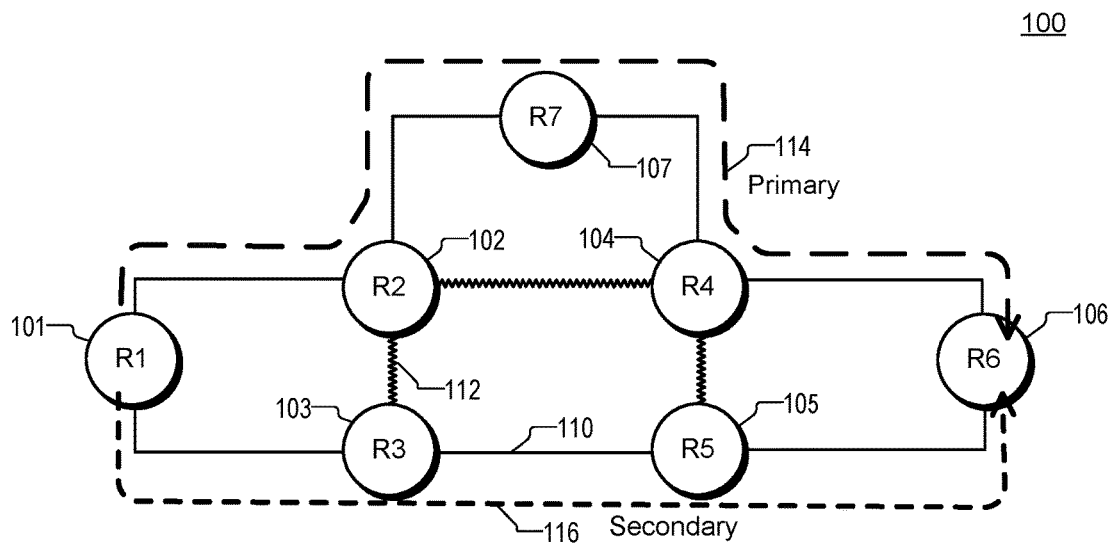
FIG. 1 is a simplified diagram illustrating certain components of an example network in which primary and secondary paths are allocated.

Methods and systems are disclosed for detection of fast reroute (FRR) occurrences in segment routing enabled networks. In one embodiment, a method includes receiving, at a first node in a communications network, a test message comprising a header, where the header comprises one or more segment identifiers. This embodiment of the method further includes detecting a first indicator of a rerouted test path for the message and sending an outgoing message to a node determined using the header, where sending the outgoing message comprises including in the outgoing message a second indicator that the test message has been rerouted.

Routing

Routing is a process for forwarding network traffic (e.g., packets) to destinations. Commonly-employed packet forwarding mechanisms include Internet Protocol (IP) routing and Multiprotocol Label Switching (MPLS). IP routing uses IP addresses inside packet headers to make forwarding decisions. In contrast, MPLS nodes (i.e., nodes employing MPLS) can make forwarding decisions using short path identifiers called labels that are attached to packets. Segment routing (SR) is yet another packet forwarding mechanism, in which packet forwarding decisions are based on short path identifiers called segment identifiers attached to packets.

MPLS labels, segment identifiers, and other types of control information may be described as "attached to" a data packet, though this information is more accurately considered to be "put into" the packet, since control information, as well as the headers and trailers it appears in, is a part of the packet, along with the payload data. In the case of MPLS labels, the labels are included between the IP header and data link layer header of an IP packet, as discussed further below. "Attached to" or "added to" a packet as used herein with reference to routing labels or identifiers should be understood to indicate that the labels or identifiers are included within the packet.

Operation of routing mechanisms such as IP or MPLS can be described in terms of a "control plane" and a "data plane." The data plane, also referred to as the "forwarding plane," does the actual forwarding of packets coming into a node. Data plane decisions may involve accessing a forwarding table that relates the appropriate packet identifier (such as an IP address or MPLS label) to the specific network interface, or egress interface, the packet should be sent to in order to send it in the right direction. Generating such a forwarding table, based on a map, database, or other information reflecting the topology of the network, is a function of the control plane.

The control plane generates and updates its network topology information using one or more routing protocols. Within an autonomous system, an interior gateway protocol (IGP) is used for exchanging network topology information between nodes. An autonomous system, or routing domain, as used herein refers to a collection of interconnected network nodes under a common administration for purposes of network configuration. Exchange of routing information between autonomous systems is done using an exterior gateway protocol such as Border Gateway Protocol (BGP).

There are different types of IGPs, which vary in terms of, for example, the particular information exchanged between nodes, whether information is shared only with neighbor nodes or "flooded" throughout the autonomous system, and how often the exchanged information is updated. In one type of IGP called a link-state routing protocol, every router constructs a topological map of network connectivity in the form of a graph, showing which routers are connected to which other routers. Each router can use its map to independently calculate the best logical path from it to every possible destination in the network. The collection of best paths will then form the routing table. Examples of link-state routing protocols include the intermediate system to intermediate system (IS-IS) and the Open Shortest Path First (OSPF) protocols.

Messages called advertisements are used in IGPs to exchange information. Nodes in an IP network automatically exchange network topology information through IGP advertisements. MPLS is compatible with IP networks, and MPLS forwarding may be incorporated into a portion of an IP network such as the Internet, forming an IP/MPLS network. Like IP nodes, MPLS nodes in an IP/MPLS network automatically exchange network topology information through IGP advertisements.

IP Routing

IP routing uses IP forwarding tables in the data plane, which are created at nodes using routing information distributed between nodes via an IGP and/or exterior gateway protocol. In simple terms, IP forwarding tables map destination IP addresses to the next hops that packets take to reach their destinations. When a node receives a packet, the node can access a forwarding table using the destination address in the packet and look up a corresponding egress interface for the next hop. The node then forwards the packet through the egress interface. The next hop that receives the packet performs its own forwarding table lookup using the same destination IP address, and so on. In an embodiment, the protocol used in forwarding the packet is Internet Protocol version 4 (IPv4). In another embodiment, the protocol used is Internet Protocol version 6 (IPv6).

MPLS

MPLS is commonly employed in provider networks. Packets enter an MPLS network via an ingress edge node, travel hop-by-hop along a label-switched path (LSP) that typically includes one or more core nodes, and exit via an egress edge node. Packets are forwarded along an LSP based on labels and label forwarding tables. Labels allow for the use of very fast and simple forwarding engines in the data plane of a network node, as compared to IP forwarding in which the destination IP address must be retrieved from the packet header at each node.

An MPLS label is implemented as a 32-bit identifier, with the lowest 20 bits allocated to the label value. The MPLS label is inserted between the IP header and data link layer header (for example, an Ethernet header) of a packet. In certain situations, such as when one MPLS domain is contained within another domain, more than one label is carried by a packet, forming a label stack. The uppermost label in a stack is closest to the data link layer header (i.e., closest to the outside of the packet). A node generally needs to read only the uppermost label in the stack for packet forwarding purposes.

MPLS labels can be associated with a forwarding equivalence class (FEC). Packets associated with the same FEC should follow the same LSP through the network. LDP is a protocol employed in the control planes of nodes. Two nodes, called LDP peers, can bi-directionally exchange labels on a FEC-by-FEC basis. LDP, along with underlying routing information provided using an IGP, can be used in a process of building and maintaining LDP forwarding tables that map labels and next-hop egress interfaces. These forwarding tables can be used to forward packets through MPLS networks.

Explicit paths can be established in MPLS networks using a protocol called Resource Reservation Protocol with Traffic Engineering (RSVP-TE) instead of or in addition to LDP. An explicit path or "tunnel" is specified using RSVP-TE when the initial node sends a request message from node to node along the length of the requested path, and the final node of the path confirms by sending back along the path an MPLS label to be used for the path. This label must then be added to the forwarding tables of the nodes along the path. This reservation process must be completed before any traffic can flow along the explicit path, and must be done again if the path is altered in response to a change in network topology or conditions.

Segment Routing

Segment routing (SR) is a mechanism in which nodes forward packets using SR forwarding tables and segment identifiers (IDs), both of which may be implemented in various data plane technologies. Like MPLS, segment routing enables a very fast and simple forwarding engine in the data plane of a node. Segment routing is not dependent on a particular Open Systems Interconnection (OSI) model data link layer technology to forward packets.

Segment routing differs significantly in the control plane from MPLS routing. Segment routing nodes (i.e., nodes employing SR) generally need not employ LDP in their control planes. Unless otherwise indicated, the SR nodes described below lack LDP in the control plane. Instead of being exchanged using a separate protocol such as LDP or RSVP-TE, segment identifiers are communicated among nodes using the IGP advertisements already employed to automatically exchange topography information in IP networks. In an embodiment, this IGP advertisement of SR identifiers is done through extensions to IGP protocols such as the IS-IS and OSPF protocols and to exterior gateway protocols such as BGP.

Certain embodiments of the segment routing methods and systems described herein are realized using data planes associated with other routing mechanisms, such as the Internet Protocol version 6 (IPv6) data plane or the MPLS data plane. In the case of the MPLS data plane, for example, segment identifiers are in one embodiment formatted as MPLS labels and included in an MPLS forwarding table, such as a label forwarding information base (LFIB), so that the MPLS data plane is not altered. In the case of the IPv6 data plane, segment identifiers are in one embodiment included in an optional extension header provided for in the IPv6 specification. It should be understood that, unless otherwise indicated, any of the segment routing methods or systems described herein may be realized using the MPLS, IPv6, or any other data plane, in addition to a dedicated segment routing data plane.

Packets (or, more generally, messages) can enter an SR-enabled network via an ingress edge node, travel hop-by-hop along a segment-switched path (SSP) that includes one or more core nodes, and exit the network via an egress edge node. An SR-enabled network includes means of generating segment identifiers, communicating segment IDs among nodes, and forwarding packets based on segment IDs.

Like MPLS labels, segment IDs are relatively short, fixed-length identifiers. Segment IDs may correspond to a topological instruction, such as a segment of a path through a network, or a service instruction, such as a service provided by a network node. Topological segments represent one-hop or multi-hop paths to SR nodes. Topological segments act as sub-paths that can be combined to form a segment path. Stacks of segment IDs can therefore encode paths through the network.

There are several types of segment IDs including, but not limited to: prefix segment IDs, node segment IDs, adjacency segment IDs, anycast segment IDs, and service segment IDs. A prefix segment ID represents a prefix segment, or a segment associated with an IGP prefix. A prefix segment represents a shortest path to a prefix or node. A node segment ID represents a node segment, which is a prefix segment that identifies a specific node. That is, a node segment ID represents an instruction that causes SR nodes to forward packets along a one-hop or a multi-hop, shortest path within the provider network to an SR node associated with the node SID. An adjacency segment ID represents a link between adjacent SR nodes (such a link between directly connected nodes may be referred to as an "adjacency" herein). An anycast segment ID represents an anycast segment, which identifies a set of nodes, rather than a specific node. Service segment IDs correspond to packet services performed by SR nodes such as deep packet inspection (DPI) and/or filtering. Each SR node can assign a distinct service segment ID for each of the SR node's packet services. The methods and systems described in this disclosure are presented primarily with reference to node segments and node segment IDs. Certain embodiments of the methods and systems described herein may be applicable to other types of segments, however, as will be understood by one of ordinary skill in the art in view of this disclosure.

Node segment IDs are assigned to respective SR nodes within the provider network and are globally unique such that no two SR nodes in the provider network are assigned the same node segment ID. In an embodiment, node segment IDs are assigned to nodes by a path computation element (PCE) server, or other control-plane server. In some embodiments, a user, such as a network administrator, detects a node coming online or joining a network and assigns the node a node segment ID. Node segment IDs can be mapped to unique SR node identifiers such as node loopback IP addresses (hereinafter node loopbacks). In one embodiment, all assigned node segment IDs are selected from a predefined ID range for the provider network. The range for node segment IDs may be different from a predefined range for labels used, for example, by LDP or RSVP-TE. In a further embodiment, a separate, smaller ID range for node segment IDs is assigned to each node, allowing a node to determine its own node segment ID or IDs within the assigned range.

As noted above, a node segment ID corresponds to a one-hop or a multi-hop path to an SR node assigned to the node segment ID. In certain embodiments, multiple node segment IDs are assigned to the same node. Multiple node segment IDs for a node may, for example, allow alternate paths to the node to be defined for traffic engineering purposes. In an embodiment, different node segment IDs for a given node are associated with respective different algorithms used by a link state protocol to calculate the path to the node. The converse situation is not permitted, however: a single node segment ID cannot be associated with more than one node.

SR nodes can advertise their node segment IDs, adjacency segment IDs, segment IDs of other types described herein and node prefixes to other SR nodes in the provider network using one or more protocols such as an interior gateway protocol (IGP), a border gateway protocol (BGP), or modified versions of such protocols. SR nodes can use the segment IDs, node prefixes, and/or other information to create or update SR forwarding tables and/or segment ID stacks.

In one embodiment, SR nodes advertise their node segment ID/node prefix pairs, adjacency segment ID/adjacency-ID pairs, and/or service segment ID/node prefix pairs. The control plane of an SR node can receive and use the node segment ID/node prefix pairs and a BGP or IGP, such as a link-state protocol (e.g., IS-IS or OSPF), or modified versions thereof, to identify egress interfaces for shortest paths to SR nodes. A shortest path egress interface, once identified, can be mapped to its respective node segment ID in the node's SR forwarding table. Nodes also map their adjacency segment IDs to egress interfaces for respective adjacencies in SR forwarding tables. Because adjacency segment IDs are locally significant, however, adjacency segment IDs should only be mapped in SR forwarding tables of the nodes that advertise the adjacency segment IDs. Service segment IDs are also locally significant and should only be mapped in the nodes in which they are advertised. Unlike adjacency segment IDs, however, service segment IDs are not mapped to egress interfaces. Rather, the service segment IDs are mapped to respective services that can be implemented by the node.

SR nodes can use segment IDs they receive in advertisements from other SR nodes in order to create ordered lists of segment IDs (i.e., segment ID stacks). Segment ID stacks correspond to SSPs, respectively, that forward packets between nodes in the provider network. Segment IDs in a stack may correspond to respective segments or sub-paths of a corresponding SSP. When an SR source node (e.g., an SR ingress provider edge node) receives a packet, the SR source node can, in an embodiment, calculate an FEC for the packet. The SR source node uses the FEC it calculates to select a segment ID stack mapped thereto. The SR source node can add the selected segment ID stack to a header, and then attach the header to the packet. The packet with attached stack can traverse the segments of the SSP in an order that corresponds to the list order of the segment IDs in the stack. A forwarding engine operating in the data plane of each SR node can use a segment ID within the stack and an SR forwarding table in order to forward the packet and header to the next node in the SSP. The SR nodes employ a mechanism to designate one of the segment IDs in the stack as the active SID. In one embodiment, the top segment ID in the stack is the active segment ID. In such an embodiment, useful when implementing segment routing with an MPLS data plane, segment IDs can be "popped" from the top of the stack as the packet and attached header are forwarded along the SSP. In another embodiment, a pointer to the stack designates the active segment ID, and the segment IDs within the segment ID stack remain unchanged as the packet is forwarded along the SSP. The active segment ID is used as a lookup into the SR forwarding table, which includes an instruction and egress interface corresponding to the active segment ID.

In response to receiving a packet with an attached segment ID stack, an SR node determines whether the active segment ID of the stack matches the segment ID assigned to the SR node. If there is a match, the packet has arrived at the destination of the segment associated with the segment ID. In response to the SR node determining that the active segment ID is assigned to the SR node, the SR node determines whether the stack includes additional segments. If not, the packet has arrived at the last node in the SSP. Otherwise, the node updates the active segment ID (e.g., pops the top segment ID, or increments a pointer to make active an underlying segment ID). If the packet has not reached the end of the SSP (e.g., the active segment ID does not correspond to the SR node or there is an underlying segment ID), the SR node accesses its SR forwarding table to read the egress interface that is mapped to the active segment ID, and forwards the packet and attached stack via the egress interface.

Topological segment identifiers such as node segment identifiers and adjacency segment identifiers encode sub-paths that can be used as building blocks to create any path through an SR-enabled network. This can be a particularly useful capability in constructing explicit paths for testing purposes, as done in certain Operations, Administration and Maintenance (OAM) procedures. Creating an explicit path in a segment routing enabled network can be done by a single node or controller forming a segment ID stack to encode the desired path. This is in contrast to, for example, the reservation procedure of RSVP-TE, which involves every node along the desired path. Segment routing networks may also recover from network disruptions more quickly than, for example, MPLS/IP networks relying on LDP to distribute labels in the event of network changes. Advertisement of segment identifiers using an IGP may allow network changes to be responded to more quickly than can be done using LDP label distribution.

Network Failure Detection

As size and utilization of networks increase, performance monitoring and maintenance become increasingly important. The most basic property to be monitored for a network path is continuity, since continuity of a path determines whether a data packet sent along the path will arrive at its destination. Data sent along a network path with a failed link or node may be lost until such time as the failure is detected and the data rerouted. Rapid detection of failures is therefore extremely important, and networks have employed various "ping" or "hello" mechanisms for this purpose.

Bidirectional Forwarding Detection (BFD), described in "Bidirectional Forwarding Detection (BFD)," by D. Katz and D. Ward, RFC 5880, June 2010, available at https://tools.ietf.org/html/rfc5880, is a useful and popular failure detection mechanism. BFD provides a relatively simple detection mechanism that is independent of the routing protocol used and generally allows shorter detection times than routing-protocol based mechanisms. Although BFD as described in RFC 5880 is intended for use across a single hop between adjacent systems, BFD can be configured for use in multi-hop paths, as described in "Bidirectional Forwarding Detection (BFD) for Multihop Paths," by D. Katz and D. Ward, RFC 5883, June 2010, available at https://tools.ietf.org/html/rfc5883. A variation of BFD called Seamless BFD (S-BFD) is described in "Seamless Bidirectional Forwarding Detection (S-BFD)," by C. Pignataro, D. Ward, N. Akiya, M. Bhatia and S. Pallagatti, May 6, 2016, available at https://tools.ietf.org/html/draft-ietf-bfd-seamless-base-11. Seamless BFD configures BFD to provide a simplified process with reduced negotiation between network nodes as compared to the "classical" BFD described in RFC 5880. Like classical BFD, seamless BFD can be used in networks employing segment routing, as described in "Seamless Bidirectional Forwarding Detection (S-BFD) for Segment Routing," by N. Akiya, C. Pignataro and N. Kumar, Feb. 23, 2015, available at https://tools.ietf.org/id/draft-akiya-bfd-seamless-sr-00.html. Each of the above-referenced BFD-related documents is hereby incorporated by reference in its entirety as if fully set forth herein.

Speaking generally, BFD and S-BFD allow an initiator node to send a BFD test packet to a remote node to perform a continuity test of the path to that node. Upon receiving the test packet, the remote node, or responder, can send a responsive BFD packet back to the initiator node. A BFD packet includes identifiers called discriminators to identify the sending node and receiving node for the packet, as well as information on time intervals between BFD packets requested or required by the node sending the packet. The packet also includes a status field with a code indicating a status of the BFD session between the two nodes (such as "up" or "administratively down"), and a diagnostic field with a code indicating a more specific characteristic of the node sending the diagnostic code (such as "neighbor signaled session down" or "forwarding plane reset"). The diagnostic code can be used, for example, by a remote system to specify a reason that the previous session failed. As described in the RFC 5880 document referenced above, several diagnostic code values were not initially mapped to diagnostic statements, instead being reserved for future use.

An example of using BFD packets in a segment routing network is described with reference to FIGS. 1 through 3. FIG. 1 shows an exemplary network 100 including nodes 101 through 107, labeled as routers R1 through R7 in the embodiment of FIG. 1, coupled to one other by communication links, which may include physical or wireless links. Links within network 100 represented by a straight line, such as link 110 between R3 and R5, are relatively low-latency links suitable for inclusion in a path subject to a service level agreement having stringent quality of service requirements. Links represented by a zigzag line, on the other hand, such as link 112 between R2 and R3, are relatively high-latency links.

In the embodiment of FIG. 1, paths 114 and 116 are designated through network 100 from R1 to R6. Path 114, shown using a long-dashed line, proceeds through routers R1, R2, R7, R4 and R6, and is designated as the primary path for certain network traffic from R1 to R6. Path 116, shown using a short-dashed line, proceeds through routers R1, R3, R5 and R6, and is designated as a secondary path for the network traffic having path 116 as a primary path.

In an embodiment, nodes (in this case, routers) R1 through R7 in network 100 are segment routing enabled nodes. Each node can therefore advertise its assigned segment identifiers to the other nodes in network 100 using an IGP with SR extensions. Using the advertisements they receive, the control planes of nodes R1 through R7 can generate SR forwarding tables for use by the respective data planes of the nodes. An ingress node to network 100, such as node R1, can also generate SR stacks encoding respective segment paths through the network. In an embodiment, functions such as creating SR stacks or assigning segment identifiers may be performed by a central network controller (not shown).

Figure 2:
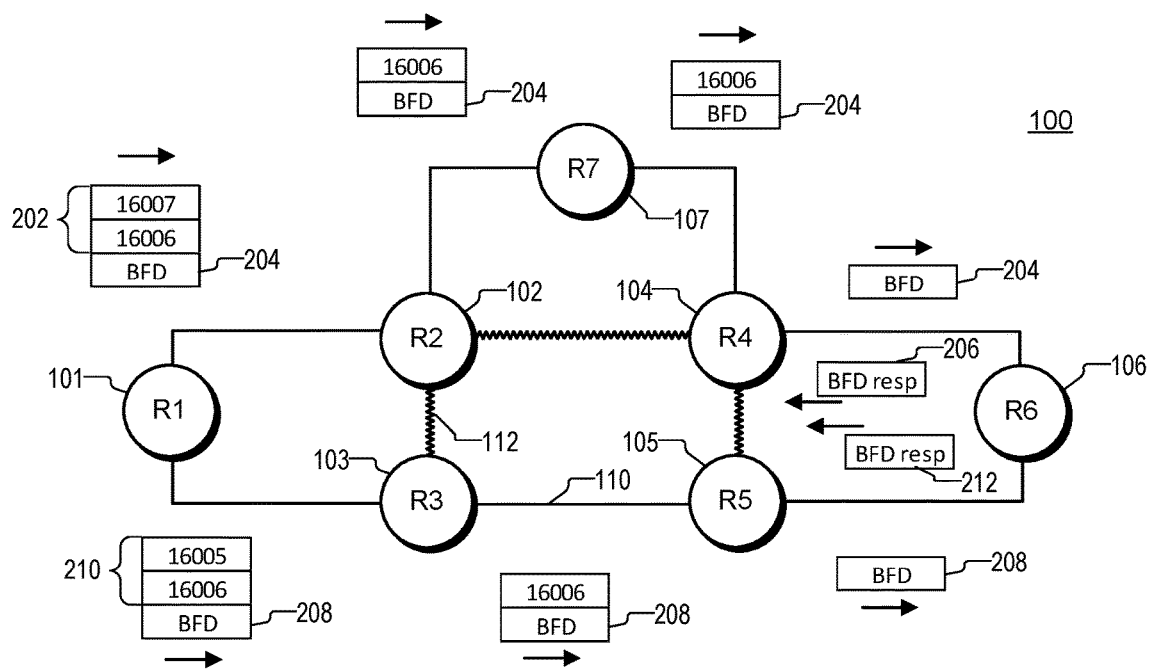
FIG. 2 is a simplified diagram illustrating use of test messages to check continuity of paths in the network of FIG. 1.

Use of segment routing to send BFD test messages through network 100 is illustrated in FIG. 2. In the embodiment of FIG. 2, a segment identifier having the value 16007 is assigned to a node segment for R7, segment ID 16005 is assigned to a node segment for R5, and segment ID 16006 is assigned to a node segment for R6. A BFD message 204 is shown traversing network 100 along primary path 114 shown in FIG. 1 (the path lines are omitted from FIG. 2 for clarity of other features). The icon representing message 204 is illustrated at successive snapshots in time as message 204 moves through the network in the direction of the arrows. At one point in time, for example, message 204 is approaching R7, while at a subsequent point in time message 204 is shown traveling between R4 and R6.

As the initiator node of a BFD test message to be sent from R1 to R6, R1 encapsulates BFD message 204 with segment ID stack 202. Segment ID stack 202 includes a segment ID having a value of 16007 and a segment ID with value 16006. In the embodiment of FIG. 2, the uppermost segment of a segment ID stack is the active segment ID, so that segment ID 16007 is the active segment ID of the encapsulated BFD packet at R1. As noted above, segment ID 16007 represents a node segment to node R7. Therefore, a forwarding engine at R1 forwards the encapsulated test packet along a shortest path toward R7. This path is calculated by a routing engine at R1 and used, in an embodiment, to create an entry for segment ID 16007 in an SR forwarding table at R1. In the embodiment of FIG. 2, the forwarding engine at R1 leaves segment ID 16007 in place and forwards the packet to R2.

Segment ID 16007 is therefore still the active segment when BFD message 204 reaches R2. An exemplary portion of an SR forwarding table that may be used at R2 is shown in FIG. 3A. Forwarding table portion 302 includes columns for the active segment ID of the incoming message, a stack instruction to be performed on the segment ID stack, and a next hop node for forwarding the message. In an alternative embodiment, an identifier of an egress interface of the forwarding node could be used to indicate forwarding direction, instead of or in addition to the next hop node. For purposes of the forwarding example of FIG. 2, table portion 302 includes only one entry, for segment ID 16007. In general, an SR forwarding table may contain multiple entries. "SR forwarding table" as used herein refers to a data structure for a given node relating segment identifiers to respective next-hop nodes or egress interfaces for forwarding of a message. A forwarding table is created by the control plane of a node for use by the data plane. Depending on the data plane implementation of an SR network, an SR forwarding table may also be referred to as a forwarding information base (FIB) or label forwarding information base (LFIB). Each of the tables described herein may alternatively take the form of a database or some other data structure, may be split into more than one data structure, or may be combined in a data structure with other tables.

In the embodiment of FIG. 3A, the stack instruction to be applied when a message having an active segment ID with value 16007 is the segment routing operation NEXT. The forwarding table portions illustrated herein include segment routing stack instruction operations followed, in brackets, by MPLS operations that implement the SR operations when an MPLS data plane is used. The message encapsulation illustrated in FIG. 2 is consistent with use of an MPLS data plane in that segment identifiers are removed at certain points as the message moves through the network. In an alternative embodiment to that of FIG. 2, the stack of segment IDs attached to a packet remains unchanged as the packet is forwarded along the segment path. In such an embodiment, a pointer, or some other information is used to identify an active segment ID in the segment ID stack. The pointer can be advanced or incremented as the packet is forwarded along the segment path. This type of implementation may be particularly suitable, for example, to applying segment routing to an IPv6 network. In an embodiment, a segment ID stack and pointer field can be included within an IPv6 extension header.

Returning to FIG. 3A, the segment routing "Next" instruction tells the forwarding node (R2, in this case) to remove the top segment identifier (or move a pointer, depending on the data plane implementation) so that the next segment identifier in the stack becomes the top identifier. The next hop node corresponding to segment ID 16007 is R7. Node 102 is therefore instructed by table portion 302 to remove segment ID 16007 from messages arriving with that ID as the active segment, and to forward the message to R7. Because segment ID 16007 is assigned to R7, this forwarding table entry implements a procedure analogous to penultimate-hop-popping (PHP) in MPLS networks. In an alternate embodiment, segment ID 16007 could be left as the active segment ID by R2 and instead removed by R7.

Returning to FIG. 2, BFD message 204 leaves R2 and moves toward R7 with only segment ID 16006 remaining from segment ID stack 202. An exemplary portion of an SR forwarding table that may be used at R7 is shown in FIG. 3B. For the purposes of this example, table portion 310 of FIG. 3B includes a single entry, for segment ID 16006. The stack instruction mapped to segment ID 16006 is the segment routing "Continue" operation. A Continue instruction tells the forwarding node to leave the active segment ID in the segment ID stack unchanged when forwarding the message to the next node along the segment path. As shown in table 310, this operation can be implemented in an MPLS data plane by a swap operation replacing an incoming 16006 label with an outgoing 16006 label. The next hop node mapped to segment ID 16006 is R4, so that R7 operates to forward BFD message 204 toward R4 with the same active segment ID having value 16006. An exemplary SR forwarding table portion for use at R4 is shown in FIG. 3C. The entry for segment ID 16006 in table portion 320 at R4 is similar to the entry for segment ID 16007 in table portion 302 at R2: in each case, the active segment ID is removed and the message is forwarded to the assigned node for the active segment ID. In the case of table portion 320 at R4, this results in BFD message 204 being forwarded to its destination node R6 with no remaining segment identifiers attached.

Upon receiving BFD message 204, R6 sends a responsive BFD message 206 back to initiator node R1, as shown in FIG. 2. Responsive BFD message 206 includes information associating it with original BFD message 204, so that receipt of responsive message 206 at R1 provides confirmation that path continuity exists along the path from R1 to R6 passing through R7. A similar test of continuity between R1 and R6 can be performed using secondary path 116 of FIG. 1. As shown in FIG. 2, BFD message 208 can be encapsulated with segment ID stack 210, where stack 210 includes segment IDs 16005 and 16006. In a similar manner to that described above for BFD message 204, message 208 is forwarded through R3 and R5 to R6, in accordance with SR forwarding tables at those nodes. Upon receiving BFD message 208 without segment ID encapsulation, R6 sends a responsive BFD message 212 back to initiator node R1. Responsive BFD message 212 includes information associating it with original BFD message 208, so that receipt of responsive message 212 at R1 provides confirmation that path continuity exists along the path from R1 to R6 passing through R5. Although examples included herein are described in terms of BFD test messages, other test message protocols or formats using transmitted and responsive test messages to monitor path continuity may be used in alternate embodiments.

Fast Reroute (FRR)

Once a network failure is detected, routes for data traffic can be recalculated to avoid the failure. Use of a failure detection protocol such as BGP can significantly reduce the time that a network failure goes undetected, from a time of up to approximately one second needed for detection through convergence of an IGP, down to a time of approximately 150 to 200 milliseconds. Transmitted data may still be significantly delayed or even lost during this detection time, however.

Fast reroute (FRR) methods can be employed to reduce traffic delays caused by link and node failures. Fast reroute typically involves a node computing in advance alternative routes (backup paths) for traffic to follow in the event of a failure. If a node has a pre-computed backup path and the node detects that one of its connected links has failed, the node can forward traffic originally intended for the failed link via the pre-computed backup path. Backup paths for FRR are generally computed using a type of loop-free alternate (LFA) algorithm, so that rerouting over a backup path does not cause traffic to loop. If a link can be protected by an LFA backup path, rerouting of data traffic over the backup path in the event of a link failure can prevent loss of data and greatly reduce delay from the failure.

Exemplary portions of SR forwarding tables incorporating FRR protection are illustrated in FIGS. 4A through 4C. Table portion 402 in FIG. 4A is for R2 in network 100 of FIGS. 1 and 2. Table portion 402 is similar to table portion 302 in FIG. 3A except that in table portion 402 there are two entries associated with segment ID 16007. In addition to the entry shown in FIG. 3A, table portion 402 includes entry 404, which has a "Continue" stack instruction and a next hop node of R4. The "(b)" notation in entry 404 indicates that next hop node R4 is on a preconfigured backup path. In the event of a failure of the link from R2 to next hop node R7, backup entry 404 in table 402 can be used to forward a message having an active segment ID value of 16007 over a backup path through R4. It can be seen from FIG. 2 that a loop-free path exists from R2 to R7 through R4. The Continue stack instruction leaves 16007 as the active segment ID, so that R4 can forward the rerouted message to R7.

An exemplary SR forwarding table for R4 including backup paths is shown in FIG. 4B. Table portion 420 of FIG. 4B includes an entry for segment ID 16007. Segment ID 16007 could be the active segment ID of, for example, a message received from a node such as R6 and headed toward R7, or of a message rerouted by R2 to reach R7 by a backup path. The primary entry for segment ID 16007 is similar to the corresponding entry in table 402 of FIG. 4A: the active segment ID is removed and the message is forwarded to next hop node R7. Table portion 420 also includes a backup entry for segment ID 16007, denoted by the "(b)" notation after the next hop node. This backup entry for segment ID 16007 mirrors the corresponding backup entry in R2 table portion 402 in that it sends a message rerouted from R4 over a backup path through R2. (This backup path would be effective only for messages received from nodes other than R2.) Table portion 420 at R4 further includes a backup entry for segment ID 16006, in which segment ID 16006 is retained as the active segment ID and the message is forwarded to R5.

Table portion 430 of FIG. 4C is an exemplary SR forwarding table portion for R5 of network 100. In the embodiment of FIG. 4C, the only entry shown is for segment ID 16006, because that is the relevant segment ID for the example at hand. The full forwarding table for node R5 may of course contain additional entries. The primary entry for segment ID 16006 is similar to the corresponding entry in table 420 of FIG. 4B: the active segment ID is removed and the message is forwarded to next hop node R6. Table portion 430 also includes a backup entry for segment ID 16006, denoted by the "(b)" notation after the next hop node. This backup entry retains segment ID 16006 as the active segment ID and sends the message over a backup path through R4.

The backup paths implemented using the forwarding tables of FIGS. 4A through 4C cause messages to be sent over the link between R2 and R4 in network 100 (in the case of the backup entries for segment ID 16007) and the link between R4 and R5 (in the case of the backup entries for segment ID 16006). As noted in the discussion of FIG. 1 above, these links are shown using a zigzag line to indicate that they are relatively high-latency links. As such, paths through these links may not comply with quality-of-service requirements. It may therefore be desirable to reduce as much as possible the amount of time that data traffic is rerouted over FRR backup paths. Failure detection protocols such as BFD generally detect failures by determining whether a test message reaches its destination or not, but such protocols do not determine how a message reaches its destination—i.e., whether the message reaches its destination via a desirable path.

Reroute Detection

The methods and systems disclosed herein allow detection of FRR occurrences, which occurrences may indicate that data traffic is using undesirable paths. Upon detection of an FRR occurrence, a network controller or ingress node may, for example, reroute data traffic over a secondary path. Use of a secondary path having acceptable quality-of-service properties can reduce the time that data traffic is routed over a lower-quality backup path. When notifications have propagated the updated topology throughout the network (also described as "convergence" of the network), a new primary path for data traffic can then be established.

Exemplary SR forwarding table portions implementing an embodiment of reroute detection are shown in FIGS. 5A through 5D. An initial comparison of the tables in FIG. 5 with those in FIG. 4 shows that the tables of FIG. 5 include additional segment IDs 17002, 17004, 17005, 17006 and 17007, in addition to segment IDs 16006 and 16007 shown in the tables of FIGS. 3 and 4. In an embodiment, each node of network 100 has at least two assigned node segment IDs, one beginning (in this example) with "16" and another beginning with "17". For example, R7 has assigned node segment IDs of 16007 and 17007. Node segment ID 16007 represents a path to R7 calculated using some suitable algorithm, such as a shortest-path-first (SPF) algorithm. Node segment ID 17007 is used for a path to R7 that includes a backup path. This type of segment ID may be referred to as a "backup node segment ID" herein.

Forwarding table portion 502 of FIG. 5A illustrates an embodiment of an SR forwarding table for R2 in network 100. Like table portion 402 of FIG. 4A, table portion 502 includes a primary entry for segment ID 16007 causing the segment ID to be removed before forwarding the received message to R7. The backup path entry for segment ID 16007 in table portion 502 is different from that of table portion 402, however. In FIG. 5A, the backup entry for segment ID 16007 includes the segment routing instructions of "Next" and "Push 17007" in the stack instruction. This results in removal of 16007 from the segment ID stack and insertion of 17007 as the active segment ID. An implementation of this stack instruction in the MPLS data plane is a swap of segment 16007 with 17007. The backup entry includes a next hop node of R4, implementing the same backup path through R4 as shown in table portion 402 of FIG. 4A. The difference is that 17007 is used as the active segment ID rather than 16007 when a backup path is employed.

Another aspect of the reroute detection method implemented using table portion 502 is illustrated by the entry shown in FIG. 5A for segment ID 17007. Arrival of a message at R2 with an active segment ID of 17007 means that the message has been rerouted somewhere along the way to its intended destination of R7. If the link between R2 and R7 is working, the entry in table portion 502 indicates that the message is sent to R7 with the 17007 segment ID still attached. This leaving of the 17007 segment ID with the message is reflected in the "Continue" stack instruction (or MPLS "swap 17007" instruction) provided for this entry. This is in contrast to the entry for segment ID 16007, in which the active segment ID is removed before the message is forwarded to R7. This difference is because the entry for segment ID 16007 employs an optional PHP process, as described above in the discussion of FIG. 3A. In the case of backup segment ID 17007, however, it is important that PHP not be used so that the backup segment ID is received by its destination node (i.e., the destination node of the node segment ID). In this way, the destination node can detect that a backup path has been used.

Because an active backup segment ID is retained until the encapsulated message reaches its destination node, table portion 502 at R2 also includes an entry for segment ID 17002, which is the backup node segment ID assigned to R2. When a message with an active backup node segment ID arrives at the destination for the node segment, the segment ID is removed. There is no forwarding based on the removed backup node segment ID, but the receiving node checks for any underlying segment IDs. If there is an underlying segment ID, forwarding continues by accessing a forwarding table entry corresponding to the underlying segment ID. If there is no underlying segment ID and the received message is a test message, a path monitoring module at the receiving node sends a responsive test message. The responsive test message includes a notification that the test message was received over a backup path, as indicated by the presence of the backup node segment ID in the received test message. In the embodiment of FIG. 5A, a backup entry is provided in table portion 502 for backup node segment ID 17007. This entry maintains the encapsulation with segment ID 17007 and forwards the message to R4.

An exemplary portion of an SR forwarding table that may be used at R7 of network 100, in an embodiment including reroute detection, is shown in FIG. 5B. Table portion 510 of FIG. 5B is similar to 310 of FIG. 3B, except that an entry for backup node segment ID 17007 is included in table 510. Because R7 is the destination node for segment ID 17007, the segment ID is removed. The message is then checked for another segment ID, and forwarded using that segment ID, if present. If no segment IDs remain, a responsive test message is sent from R7 to the initiator node of the test message. Included in the responsive message is a notification that the test message reached R7 over a path including a backup path.

An exemplary portion of an SR forwarding table that may be used to implement reroute detection at node R4 of network 100 is shown in FIG. 5C. Table portion 520 of FIG. 5C operates in a similar manner as table portion 502 of FIG. 5A, for corresponding entry types. For example, backup entries for segment IDs 16007 and 16006 include instructions to replace those segment IDs with backup node segment IDs 17007 and 17006, respectively. Primary entries for segment IDs 17007 and 17006 include instructions to forward to the respective destination nodes with the active segment ID intact. Backup entries for backup node segment IDs 17007 and 17006 include instructions to forward to the next-hop node on the backup path, with the active segment ID intact. Finally, backup node segment ID 17004 is handled in the same manner as described above for handling of segment IDs 17002 and 17007 at their respective destination nodes.

An exemplary portion of an SR forwarding table that may be used to implement reroute detection at node R5 of network 100 is shown in FIG. 5D. Table portion 530 of FIG. 5D operates in a similar manner as tables 502 and 520, for corresponding entry types. For example, the backup entry for segment ID 16006 includes instructions to replace that segment ID with backup node segment ID 17006, before forwarding to next hop R4 on a backup path to R6. The primary entry for backup node segment ID 17006 includes an instruction to retain the segment ID when forwarding the message to destination node R6. The backup entry for backup node segment ID 17006 includes an instruction to retain the segment ID when forwarding the message to next hop R4 on the backup path. Backup node segment ID 17005 is handled in the same manner as described above for handling of segment IDs 17002 and 17007 at their respective destination nodes.

In an embodiment, each node of a segment routing network implementing reroute detection has an assigned backup node segment ID. In a further embodiment, only one backup node segment ID is assigned to each node, even when each node has multiple other assigned node segment IDs for various purposes. In an embodiment, backup node segment IDs, such as the IDs described above having values beginning with "17", are advertised using an IGP in a similar manner to other segment IDs in the network, except that advertisements for backup node segment IDs indicate that PHP is disabled. Backup node segment IDs have the properties of other node segment IDs; for example, they are globally unique within the provider network. The segment routing control plane at each node populates the node's forwarding table with backup node segment IDs in the same way as for other node or prefix segment IDs, using the rules that any backup path entries replace a non-backup node segment ID with the backup node segment ID assigned to the same node, and that no PHP is used when forwarding a message having a backup node segment ID as the active segment ID. Backup paths for backup node segment IDs are calculated in the same way as for other node segment IDs.

Figure 6A:
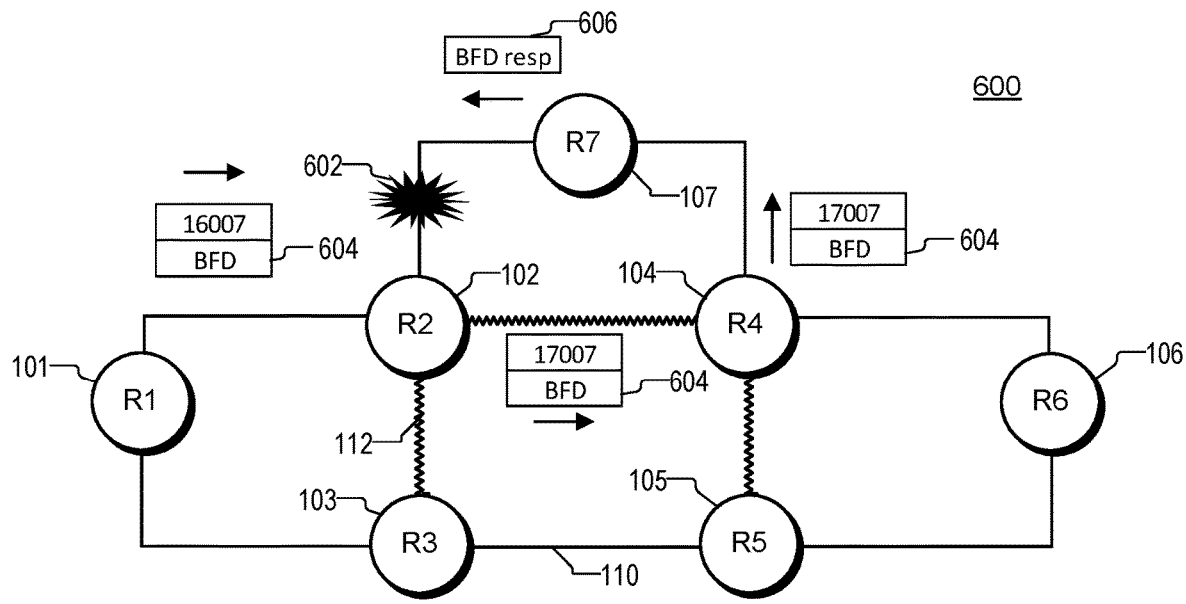
FIGS. 6A and 6B are simplified diagrams illustrating reroute of test messages in networks configured for reroute detection.

An example of forwarding a BFD test message through a network employing reroute detection is illustrated by FIG. 6A. Network 600 of FIG. 6A has the same configuration of nodes and links as network 100 of FIGS. 1 and 2, except that a failure 602 has occurred between R2 and R7. In the embodiment of FIG. 6A, nodes R2, R4, R5 and R7 of network 600 are configured for forwarding using respective corresponding forwarding tables shown in FIGS. 5A through 5D. As shown in FIG. 6A, a BFD test message 604 is sent by initiator node R1 toward R7, encapsulated with segment ID 16007. At R2, failure 602 is detected, so that BFD message 604 is forwarded using the backup entry for segment ID 16007 in R2 forwarding table 502. According to the backup entry, segment ID 16007 is replaced with backup node segment ID 17007, and the message is forwarded to next hop R4 on the backup path. As shown in FIG. 6A, at this point message 604 is traversing the relatively high-latency link between R2 and R4, which may in some embodiments be out of compliance with service level agreements or otherwise be an undesirable path. At R4, test message 604 is forwarded using the primary entry for active segment ID 17007 in R4 SR forwarding table 520. According to this entry, segment ID 17007 is maintained as the active segment ID when message 604 is forwarded to destination node R7.

When message 604 reaches R7, active segment ID 17007 is removed, according to the entry for this segment ID in R7 forwarding table 510. Because there is no underlying segment ID and the message is a BFD test message, a BFD response message 606 is sent from R7 back to initiator node R1. Routing of response message 606 is not shown in detail in FIG. 6A. In an embodiment, response message 606 is sent by IP routing. In a further embodiment, this routing employs FRR techniques where needed to deliver the response message 606. Response message 606 includes an indication that BFD message 604 was received over a backup path. In an embodiment, the indication is sent using a BFD diagnostic code assigned for this purpose. In alternative embodiments the indication of backup path use may be encoded in a different way, but an indication that a backup path was used is returned in some manner to the initiating node of the test message. In an embodiment in which test messages are sent continuously, use of the backup node segment ID disclosed herein can result in detection of reroute occurrences within a time of approximately 150 to 200 milliseconds. If data traffic is shifted to a secondary, higher-quality path at the time of detection, the amount of time that data traffic travels over an undesirable backup path can be significantly reduced.

It is noted that the forwarding illustrated by FIG. 6A does not disturb the forwarding of data traffic. The same procedure of using the backup node segment ID for rerouted messages is used for data messages as for test messages. In the embodiment of FIG. 6A, if a data message arrives at R7 with additional segment IDs underlying segment ID 17007, the data message will be forwarded in the usual manner for the network based on the underlying segment ID. If a data message arrives at R7 having no additional segment IDs underlying segment ID 17007, such that R7 is the destination node for the segment-routed path of the data message, R7 will handle the data message based on the type of message. For example, R7 may hand off the message to a protocol used outside of the SR domain, such as an IP protocol or an IP/MPLS protocol employing LDP.

Figure 6B:
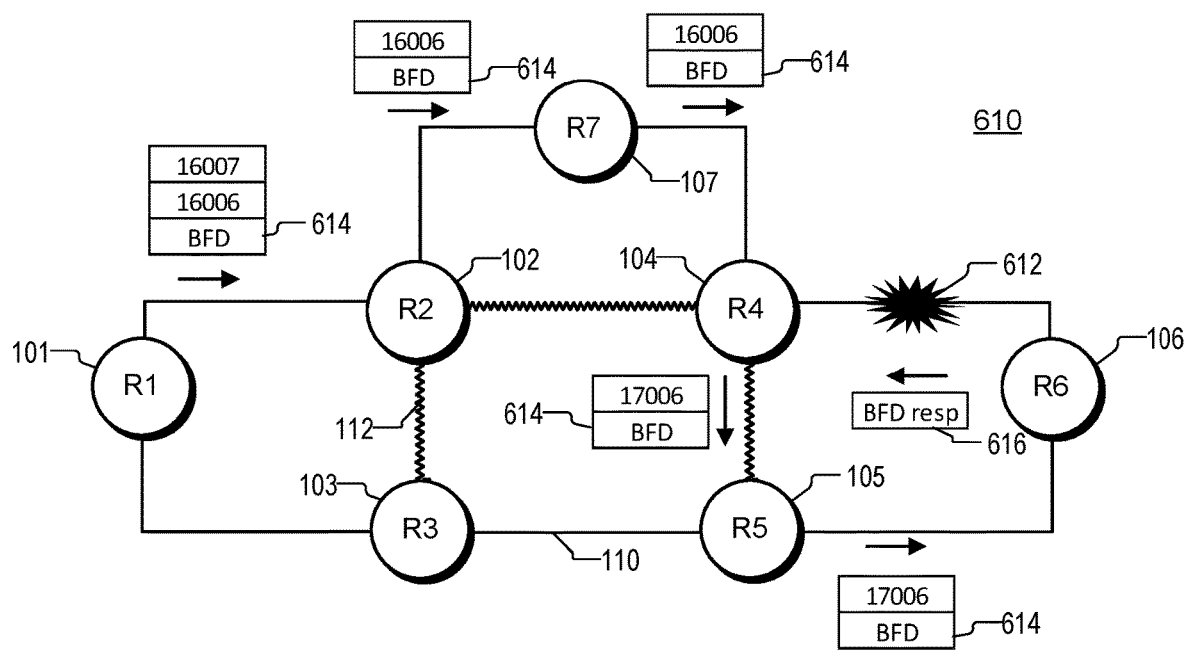

An additional example of forwarding a BFD test message through a network employing reroute detection is illustrated by FIG. 6B. Network 610 of FIG. 6B differs from network 600 of FIG. 6A in that instead of failure 602 between R2 and R7 network 610 includes a failure 612 between R4 and R6. As in the embodiment of FIG. 6A, nodes R2, R4, R5 and R7 of network 610 are configured for forwarding using respective corresponding forwarding tables shown in FIGS. 5A through 5D. As shown in FIG. 6B, a BFD test message 614 is sent by initiator node R1 toward R6. Test message 614 is encapsulated with node segment IDs 16007 and 16006 to provide a test path to R6 passing through R7. At R2, active segment ID 16007 is removed and message 614 is forwarded to next hop R7 with 16006 as the new active segment ID, according to the entry in R2 forwarding table 502 for segment ID 16007. Message 614 is then forwarded from R7 to next hop R4 with active segment ID 16006 intact, according to the entry in R7 forwarding table 510 for segment ID 16006.

At R4, failure 612 is detected, so that message 614 is forwarded using the backup entry for segment ID 16006 in R4 forwarding table 520. According to the backup entry, segment ID 16006 is replaced with backup node segment ID 17006, and the message is forwarded to next hop R5 on the backup path. As shown in FIG. 6B, at this point message 614 is traversing the relatively high-latency link between R4 and R5, which may in some embodiments be out of compliance with service level agreements or otherwise be an undesirable path. At R5, test message 614 is forwarded using the primary entry for active segment ID 17006 in R5 SR forwarding table 530. According to this entry, segment ID 17006 is maintained as the active segment ID when message 614 is forwarded to destination node R6. When message 614 reaches R6, active segment ID 17006 is removed, in analogy to the examples described above for handling of a backup node segment ID by the destination node for the backup node segment ID. In a similar manner to that described for destination node R7 in the embodiment of FIG. 6A, destination node R6 sends BFD response message 616 to initiator node R1 of BFD message 614. Response message 616 includes an indication that test message 614 was received over a backup path. In an embodiment, response message 616 includes a BFD diagnostic code indicating that test message 614 was received over a backup path.

In both of the examples shown in FIGS. 6A and 6B, the failure occurs along the route corresponding to the node segment ID assigned to the destination node for the test message. In other words, the test message was encapsulated only with the node segment ID for its destination node, and not with any other segment IDs, when it reached the location of the failure. In this situation, the destination node for the test message is able to detect, from the presence of the backup node segment ID, that the test message was received over a route including a backup path. By way of contrast, consider the result of forwarding message 614 along its test path to R6 via R7 if network 610 included failure 602 between R2 and R7 instead of failure 612 between R4 and R6. Message 614 would be rerouted in the same manner described for message 604 in connection with FIG. 6A, by replacing active segment ID 16007 with backup node segment ID 17007, and forwarded through R4 to R7. Message 614 would arrive at R7 with segment ID 16006 underlying backup node segment ID 17007, however. Therefore, R7 would forward message 614 based on underlying segment ID 16006 after removing active segment ID 17007. As a result, message 614 leaving R7 would no longer carry any indication that it had traveled over a backup path.

As illustrated by the above example, the backup node segment IDs described herein are effective to signal that a backup path has been used for a test message only when the backup node segment ID being used in response to a network failure is the backup node segment ID assigned to the destination node for the test message. In an embodiment, reroute detection for multiple portions of a test path is achieved by sending multiple test messages, each having a different node along the test path as a destination node. For example, rerouting may be detected at multiple points along the path from R1 to R6 by sending test messages along three separate test paths: one from R1 to R2, another from R1 to R7 (as in FIG. 6A), and another from R1 to R6 (as in FIG. 6B). The test message sent to R2 can be used to detect rerouting caused by a failure between R1 and R2, the message sent to R7 can detect a failure between R1 and R7 such as that in FIG. 6A, and the message sent to R6 can detect a failure between R4 and R6 as in FIG. 6B. In an embodiment, test messages are sent along such separate paths to multiple destinations repeatedly, in a continuous fashion, so that a reroute occurrence along any of the corresponding path portions may be quickly detected.

In the embodiments described above, segment ID stacks for test messages end with a node segment assigned to the destination node of the intended test path. The destination node then removes any remaining node segment assigned to that node and still attached to the received message, and processes the test message if no underlying segment IDs remain. In an embodiment implementing segment routing with an MPLS data plane, the destination node of the intended test path can also be identified using a TTL ("time-to-live") field provided in the MPLS label structure. The MPLS label TTL field identifies a number of hops (between 0 and 255) along the message path that the message has left to remain valid, and is decremented by the forwarding node at each hop. When a TTL value is decremented to zero, the message is "intercepted" (sent to the control plane) for further inspection and/or processing. In an embodiment of an MPLS implementation, a segment ID stack for a test message may include one or more additional segment IDs below the node segment ID assigned to the intended destination node, but with the TTL value of each MPLS label implementing the additional segment ID(s) set to "1". The TTL values of MPLS labels implementing the segment ID for the intended destination node and any segment IDs for segments on the way to the destination node are set to a large value such as 255 in such an embodiment.

For example, the test path to R7 shown in FIG. 6A can be implemented with a segment ID stack including the 16007 segment ID shown over a 16006 segment ID having its corresponding MPLS TTL set to "1". Similarly, a test path from R1 to R2 can be implemented in an MPLS data plane with a segment ID stack including node segment ID 16002 for R2 over segment ID 16007 having its MPLS TTL set to "1". In a further embodiment, the segment ID stack for a test path from R1 to R2 can include segment ID 16002 over segment ID 16007 and segment ID 16006, where the MPLS TTL for both segment IDs 16007 and 16006 are set to "1". Use of the same segment ID stack, except for differences in MPLS TTL values, for each of multiple test message sessions can help to ensure that each test session is using the same data path (over shared portions of the intended paths) in the event that the data path includes branches over which ECMP load balancing can occur.

In an MPLS-implemented embodiment having an additional segment ID underlying the node segment ID of the test message destination node, the destination node removes the node segment ID assigned to itself (if not already removed through a PHP process). This exposes the underlying additional segment ID. Because the destination node decrements the TTL value of the segment ID before forwarding in an MPLS implementation, the TTL value of the additional segment becomes zero before the message is forwarded. This causes the test message to be processed at the test message destination node (by sending the responsive test message, for example) rather than forwarded. In an embodiment of sending test messages in an IP network (including an MPLS/IP network), a destination address of the test message is set to be in the 127/8 range for IPv4 or the 0:0:0:0:0:FFFF:7F00/104 range for IPv6. This addressing may prevent IP forwarding of the test message if it fails to reach its intended destination. In a further embodiment, the destination address is set to the IPv4 address of 127.0.0.0 (or the equivalent IPv6 address). When the test message has been sent to the control plane after reaching its segment routing destination, the 127.0.0.0 loopback address triggers the control plane to discover that the payload is a test message and to send a responsive test message.

In the embodiment of reroute detection described above in connection with FIGS. 5A through 6B, a unique backup node segment ID is assigned to each node in a segment routing enabled network. Exemplary SR forwarding table portions implementing a different reroute detection embodiment are shown in FIGS. 7A through 7D. In the embodiment of FIGS. 7A through 7D, a single segment ID is designated for use throughout the network to signal that a backup path has been used. This segment ID functions in the manner of a context segment ID (or a context MPLS label in an embodiment using an MPLS data plane). This single segment ID for signaling backup path usage is referred to as a "backup context segment ID" or "context backup segment ID" herein. Both the backup node segment IDs described in the embodiment of FIGS. 5A through 6B and the backup context segment ID described in connection with the embodiment of FIGS. 7A through 8 may generally be referred to as "backup-path segment IDs" herein. Instead of the backup node segment IDs 17002, 17004, 17005, 17006 and 17007 appearing in the forwarding tables of FIGS. 5A through 5D, the tables of FIGS. 7A through 7D include a single backup context segment ID 18000. Instead of replacing the active segment ID with a backup node segment ID, the backup forwarding table entries of FIGS. 7A through 7D operate by pushing backup context segment ID 18000 onto the segment ID stack of the forwarded message along with the active node segment ID, which is retained.

Forwarding table portion 702 of FIG. 7A illustrates an embodiment of an SR forwarding table for R2 in network 100. Like other R2 forwarding tables described herein, table portion 702 includes a primary entry for segment ID 16007 causing the segment ID to be removed before forwarding the received message to R7. In the embodiment of FIG. 7A, the backup entry for segment ID 16007 includes the segment routing instructions of "Next" and "Push 18000, 16007". This results in removal of 16007 from the segment ID stack and insertion of 18000 and then 16007, so that 18000 is effectively inserted in the original segment ID stack underneath active segment ID 16007. This stack instruction can be implemented in an MPLS data plane as a swap of segment ID 16007 with segment ID 18000, followed by pushing of segment ID 16007 onto the stack again. The backup entry includes a next hop node of R4, implementing the same backup path through R4 as shown in the other R2 forwarding tables described herein. Because a message forwarded using the backup entry in table portion 702 is sent to R4 with 16007 as the active segment ID, this entry has an effect similar in some ways to that of backup entry 404 in table portion 402 of FIG. 4A. The difference with the backup entry in table portion 702 is that segment ID 18000 is inserted beneath segment ID 16007.

As discussed above in connection with, for example, FIG. 4A, forwarding table entries for node segment IDs other than the backup node segment IDs in the tables of FIGS. 5A through 5D (those beginning with "17") in the embodiments discussed above implement an optional PHP method in which the active node segment ID is removed if the next hop is the destination node for that node segment ID. Because of this PHP process, no entry for segment ID 16002 is included in table portion 702, because an active segment ID 16002 would be removed by any node forwarding a message to R2 as the final hop. Table portion 702 does include an entry for backup context segment ID 18000, however, because in the event that a message with active segment ID 16002 is forwarded via a backup path, removal using PHP of segment ID 16002 would leave 18000 as the active segment ID. Segment ID 18000 is handled in a similar manner to, for example, backup segment ID 17002 in table portion 502 of FIG. 5A. Segment ID 18000 is removed and the receiving node checks for any underlying segment IDs. If there is an underlying segment ID, forwarding continues by accessing a forwarding table entry corresponding to the underlying segment ID. If there is no underlying segment ID and the received message is a test message, a path monitoring module at the receiving node sends a responsive test message. The responsive test message includes a notification that the test message was received over a backup path, as indicated by the presence of the backup context segment ID in the received test message.

An exemplary portion of an SR forwarding table that may be used at R7 of network 100 in an embodiment of reroute detection using a backup context segment is shown in FIG. 7B. Table portion 710 of FIG. 7B is similar to table portion 510 of FIG. 5B, except that it includes an entry for backup context segment ID 18000 rather than backup node segment ID 17007. Segment ID 18000 is handled in the same manner in table portion 710 as described above for handling of this segment in table portion 702 at R2.

An exemplary portion of an SR forwarding table that may be used to implement reroute detection using a backup context segment at node R4 of network 100 is shown in FIG. 7C. Table portion 720 of FIG. 7C operates in a similar manner as table portion 702 of FIG. 7A, for corresponding entry types. For example, each of the backup entries for segment IDs 16007 and 16006 includes instructions having the effect of retaining the active node segment ID while inserting backup context segment ID 18000 into the segment stack below the active node segment ID. In addition, segment ID 18000 is handled in the same manner in table portion 710 as described above for handling of this segment in table portion 702 at R2.

An exemplary portion of an SR forwarding table that may be used to implement reroute detection using a backup context segment at node R5 of network 100 is shown in FIG. 7D. Table portion 730 of FIG. 7D operates in a similar manner as table portions 702 and 720, for corresponding entry types. For example, the backup entry for segment ID 16006 includes instructions having the effect of retaining that segment ID as the active node segment ID while inserting backup context segment ID 18000 into the segment stack just below it. In addition, segment ID 18000 is handled in the same manner in table portion 730 as described above for handling of this segment in table portion 702 at R2.

In an embodiment, a single backup context segment ID, such as segment ID 18000 described above, is assigned for an entire segment routing network or autonomous system. In an embodiment, a backup context segment ID is advertised using an IGP in a similar manner to other segment IDs in the network. In a further embodiment, the backup context segment ID is assigned and advertised using a network controller or mapping server. The segment routing control plane at each node uses the backup context segment ID in creating backup path entries for prefix or node segment IDs in the node's forwarding table, using a rule that backup path entries cause a segment ID stack to be used having the backup context segment ID inserted below the active node segment ID.

Figure 8:
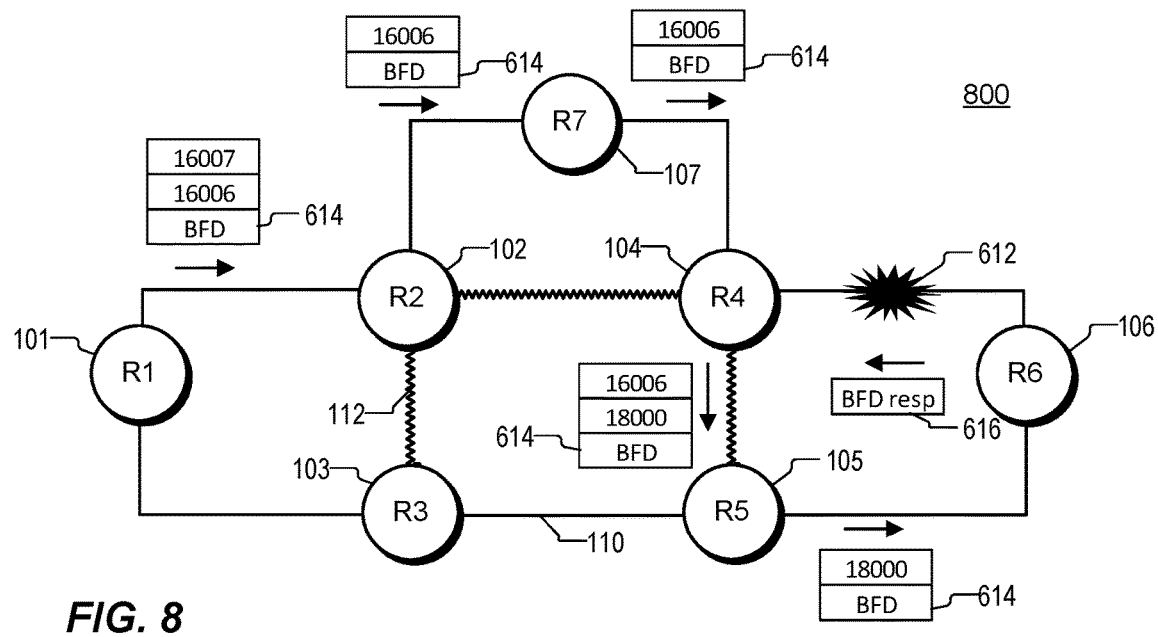
FIG. 8 is a simplified network diagram illustrating reroute of test messages in a network configured for reroute detection using a backup context segment identifier.

An example of forwarding a BFD message through a network employing reroute detection using a backup context segment ID is illustrated by FIG. 8. Network 800 of FIG. 8 has a similar configuration to network 610 of FIG. 6B, in that it includes a failure 612 between R4 and R6. In the embodiment of FIG. 8, nodes R2, R4, R5 and R7 of network 800 are configured for forwarding using respective corresponding forwarding tables shown in FIGS. 7A through 7D. In the same manner shown in FIG. 6B, a BFD test message 614 is sent by initiator node R1 toward R6 of network 800. Test message 614 is encapsulated with node segment IDs 16007 and 16006 to provide a test path to R6 passing through R7. Until detection of a failure, forwarding of message 614 by segment routing proceeds in the same manner through network 800 as described above for network 610. At R2, active segment ID 16007 is removed and message 614 is forwarded to next hop R7 with 16006 as the new active segment ID, according to the entry in R2 forwarding table 702 for segment ID 16007. Message 614 is then forwarded from R7 to next hop R4 with active segment ID 16006 intact, according to the entry in R7 forwarding table 710 for segment ID 16006.

At R4, failure 612 is detected, so that message 614 is forwarded using the backup entry for segment ID 16006 in R4 forwarding table 720. According to the backup entry, segment ID 16006 is replaced by a stack with segment ID 18000 below segment ID 16006. Message 614 is then forwarded to next hop R5 on the backup path, as shown in FIG. 8. At this point message 614 is traversing the relatively high-latency link between R4 and R5, which may in some embodiments be out of compliance with service level agreements or otherwise be an undesirable path. At R5, test message 614 is forwarded using the primary entry for active segment ID 16006 in R5 SR forwarding table 730. According to this entry, segment ID 16006 is removed in accordance with the PHP normally implemented in network 800. Test message 614 is therefore forwarded to destination node R6 with backup context segment ID 18000 as its only segment ID. When message 614 reaches R6, active segment ID 18000 is removed according to an entry in a forwarding table at R6 (not shown) having the same stack instruction for segment ID 18000 as in each of the forwarding tables shown in FIGS. 7A through 7D for other nodes in network 800. Because there is no underlying segment ID and the message is a BFD test message, a BFD response message 616 is sent from R6 back to initiator node R1, in a similar manner to that described for sending of response message 606 of FIG. 6A. Response message 616 includes an indication that test message 614 was received over a backup path, as indicated to R6 by the presence of backup context segment ID 18000. In an embodiment, response message 616 includes a BFD diagnostic code indicating that test message 614 was received over a backup path.

Like the reroute detection embodiments of FIGS. 6A and 6B, reroute detection using a backup context segment ID does not disturb the forwarding of data traffic. In particular, the presence of a backup context segment ID such as segment ID 18000 does not affect the forwarding of data traffic through a segment routing enabled network such as network 800. The embodiment of FIG. 8 is also similar to those of FIGS. 6A and 6B in that the backup context segment ID is effective to signal that a backup path has been used only to the destination node of the active node segment ID when the failure is encountered. Sending of separate test messages to different nodes along a tested path, as described above for the embodiments of FIGS. 6A and 6B, is also an effective approach for the embodiment of FIG. 8.

Figure 9A:
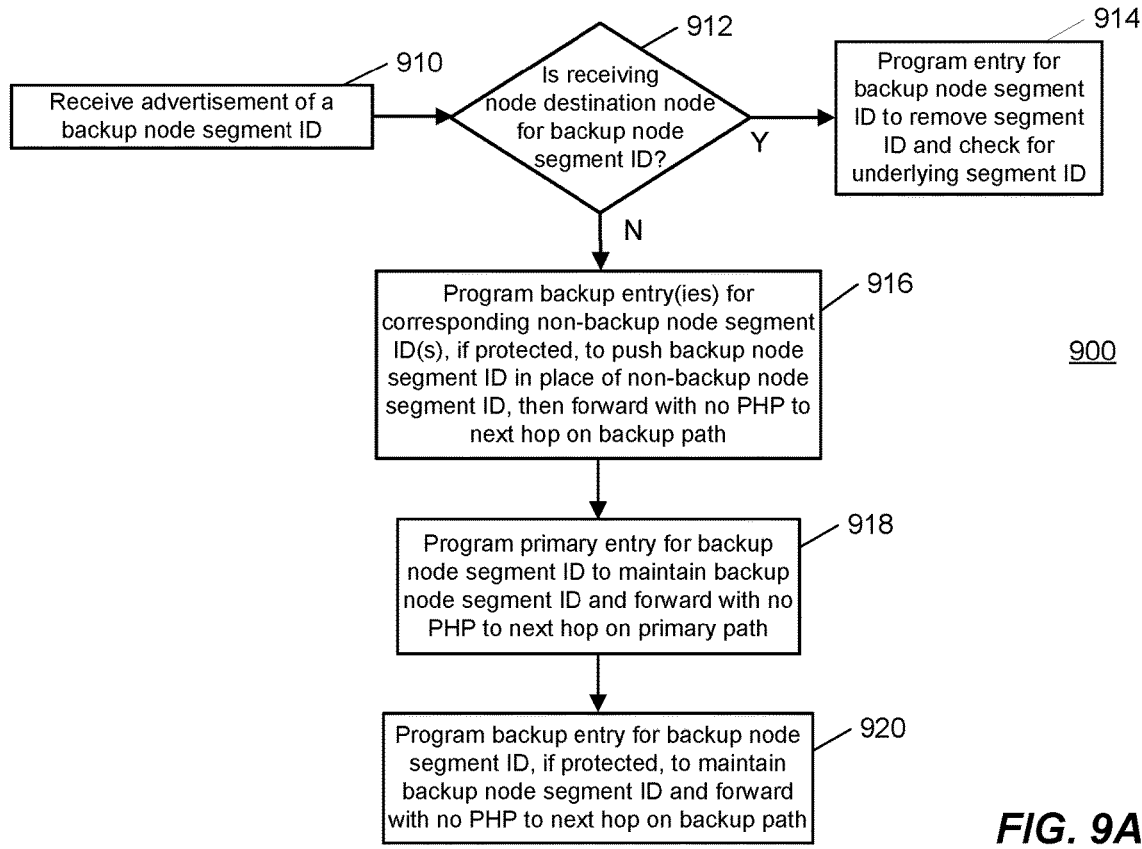
FIGS. 9A and 9B are flowcharts illustrating examples of processes of preparing a network node for reroute detection.
Figure 9B:
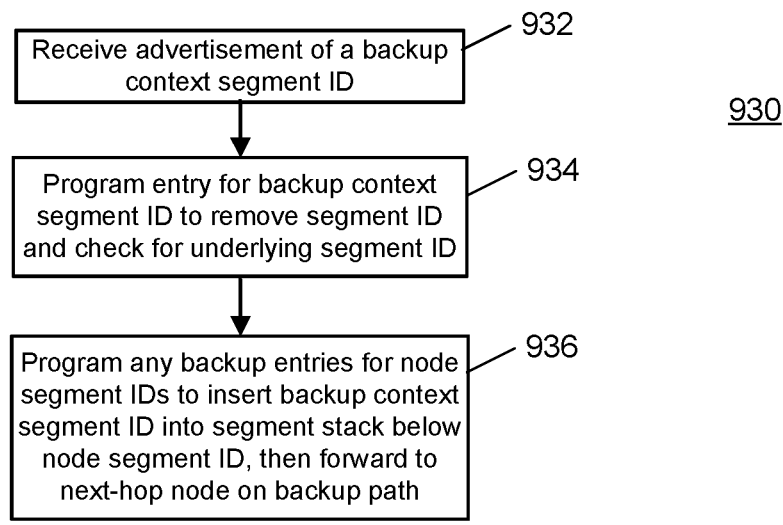

The flowcharts of FIGS. 9A and 9B illustrate embodiments of a process of preparing a network node for use of reroute detection. FIG. 9A illustrates an embodiment of a method of preparing a network node for reroute detection using backup node segment IDs as discussed further in connection with FIGS. 5A through 6B above. FIG. 9B illustrates an embodiment of a method of preparing a network node for reroute detection using a backup context segment ID as discussed further in connection with FIGS. 7A through 8 above. In an embodiment, method 900 of FIG. 9A or 930 of FIG. 9B is performed by a network node, in the form of a router or other communications processing device associated with a node. In an alternative embodiment, either of these methods is performed by a network controller, which may perform the method for each of multiple network nodes.

Method 900 of FIG. 9A begins with receiving advertisement of a backup node segment ID (step 910). In an embodiment, the advertisement is an IGP advertisement. In a further embodiment, the advertisement is sent using a link state protocol such as IS-IS or OSPF. A backup node segment ID received according to step 910 is similar to, for example, segment IDs 17002, 17004, 17005, 17006 and 17007 described above in connection with FIGS. 5A through 5D. If the receiving node (or the node for which a controller is performing method 900) is the destination node for the received backup node segment ID ("yes" branch of decision step 912), an entry for the backup node segment ID in the SR forwarding table at the node is programmed for removal of the backup node segment ID and checking for an underlying segment ID (step 914). This behavior by the destination node is discussed further above in connection with, for example, segment ID 17002 in FIG. 5A. In an embodiment, programming the entry for the backup node segment ID comprises updating an existing entry to reflect network changes. In an embodiment for which an entry for the backup node segment ID has not been created, programming the entry comprises creating the entry.

If the receiving node is not the destination node for the received backup node segment ID ("no" branch of decision step 912), method 900 continues in step 916 with programming, in an SR forwarding table for the node, a backup entry for any corresponding non-backup node segment IDs, where a corresponding node segment ID is a node segment ID assigned to the same node as the backup node segment ID. Although the exemplary network configuration illustrated in FIGS. 5A through 6B includes a single non-backup node segment ID (beginning with "16") for each node of network 100, in other embodiments there may be multiple node segment IDs assigned to each node, and each may have an FRR backup path implemented in the SR forwarding tables within the network. Step 916 is performed at nodes for which a node segment ID corresponding to the received backup node segment ID is protected (has an FRR backup entry). Each backup entry is programmed to push the backup node segment ID onto the segment ID stack of a received message in place of the corresponding non-backup node segment ID, then to forward the message with no PHP to the next hop on the backup path (step 916). Examples of this programming can be seen in the backup entries for segment IDs 16007 and 16006 appearing in the SR forwarding tables of FIGS. 5A through 5D above. In an embodiment, the same backup node segment ID is used in programming backup entries for all corresponding node segment IDs. In an embodiment, programming a backup entry comprises updating an existing entry to implement reroute protection or to reflect network changes. In an embodiment for which a desired backup entry has not been created, programming the entry comprises creating the entry.

Method 900 further includes, when the receiving node is not the destination node for the received backup node segment ID, programming a primary entry for the backup node segment ID (step 918), where the primary entry is programmed to maintain the backup node segment ID as the active segment ID and forward with no PHP to the next hop on the primary path. This type of primary path programming is discussed further above in connection with, for example, segment IDs 17007 and 17006 in FIG. 5C. In an embodiment, programming the primary entry for the backup node segment ID comprises updating an existing entry to reflect network changes. In an embodiment for which an entry for the backup node segment ID has not been created, programming the entry comprises creating the entry. At nodes for which the primary entry for the backup node segment ID is protected, method 900 further includes programming a backup entry for the backup node segment ID (step 920). The backup entry is programmed to maintain the backup node segment ID as the active segment ID, and forward with no PHP to the next hop on the backup path. This type of backup path programming is discussed further above in connection with, for example, the backup entries for segment IDs 17007 and 17006 in FIG. 5C.

While method 900 described above illustrates preparation at a network node for reroute detection using backup node segment IDs, method 930 of FIG. 9B prepares a network node for reroute detection using a backup context segment ID. Method 930 begins with receiving advertisement of a backup context segment ID (step 932). The advertisement used may have a form similar to that described in connection with step 910 of FIG. 9A, and a backup context segment ID received in step 932 is similar to, for example, segment ID 18000 described above in connection with FIGS. 7A through 7D. Method 930 continues with programming an entry for the received backup context segment ID in the SR forwarding table at the receiving node (step 934). The entry for the backup context segment ID is programmed to remove the backup context segment ID and check for an underlying segment ID. This behavior is described further above in connection with the entry for segment ID 18000 in table portion 702 of FIG. 7A. In an embodiment, programming the entry for the backup context segment ID comprises updating an existing entry to reflect network changes. In an embodiment for which an entry for the backup context segment ID has not been created, programming the entry comprises creating the entry.

Method 930 continues in step 936 with programming any backup entries for node segment IDs in the SR forwarding table to insert the backup context segment ID into the segment stack of a forwarded message, below the protected node segment ID, as discussed further in connection with FIGS. 7A through 8 above. The backup entry is further programmed to forward the modified message to the next hop on its calculated backup path, as also discussed further in connection with the embodiment of FIGS. 7A through 8.

In an embodiment of a method such as methods 900 and 930 described above, a received advertisement includes multiple backup segment IDs. In a further embodiment, the method of preparing a network node for use of reroute detection is performed for each of the received backup segment IDs. Such an embodiment could proceed by performing the full method for each of the received backup segment IDs in turn. Alternatively, each step of the method could be performed for all received backup segment IDs (of the appropriate "node" or "context" type) before the next step of the method is performed for all of the received backup segment IDs.

Figure 10:
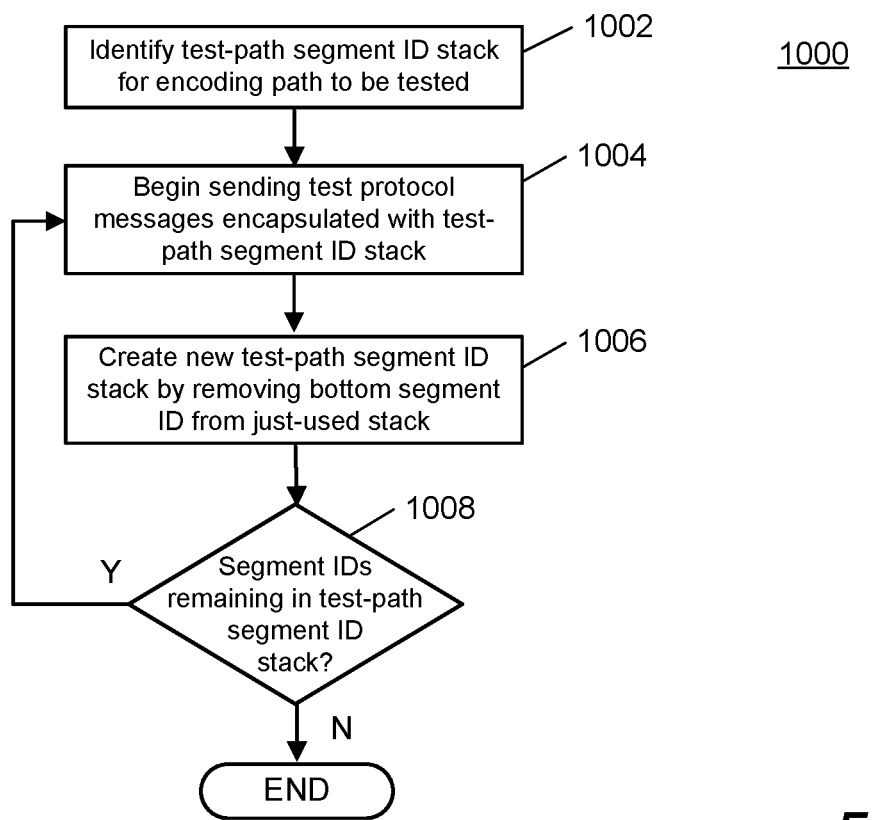
FIG. 10 is a flowchart illustrating an example of a process of establishing test paths in a network.

The flowchart of FIG. 10 illustrates an embodiment of a method of establishing segment ID stacks for sending test messages to detect reroute occurrences along a test path. In an embodiment, method 1000 is performed by an ingress node of a segment routing network. Method 1000 may also be performed by another node in an SR network acting as an initiator node for a test messaging protocol. In another embodiment, method 1000 is performed by a network controller. Method 1000 begins with identifying a test-path segment ID stack for encoding the path to be tested (step 1002). In an embodiment, the segment ID stack includes one or more node segment IDs. For example, a segment ID stack that can be used to encode primary path 114 for network 100 (shown in FIG. 1) includes node segment IDs 16007 and 16006, as shown in FIG. 2 or FIG. 6B. Including node segment 16007 in the stack ensures that the test message is routed through R7 rather than taking a different path to destination R6. In step 1004 of method 1000, test protocol messages, such as BFD messages, are sent using the segment ID stack determined in step 1002 of the method. In an embodiment, the test protocol messages are sent repeatedly in a continual fashion during a period during which reroute detection is desired.

Method 1000 further includes creating a new test-path segment ID stack by removing the segment ID from the bottom of the previous segment ID stack (step 1006). If one or more segment IDs remain in the resulting test-path segment stack ("yes" branch of decision step 1008), the method returns to step 1004 so that this stack is also used for sending of test protocol messages. The test messages sent using the new testing segment ID stack are sent over a subpath of the test path encoded by the previous test-path segment ID stack. In an embodiment for which each test-path segment ID stack is used to send test messages repeatedly in a continual fashion, each of the multiple test paths encoded by the respective multiple test-path segment ID stacks is repeatedly traversed by test messages. In segment routing networks programmed to provide reroute detection using the methods described herein, destination nodes of the respective multiple test paths can send a notification to the initiator node of the test messages when a test message is rerouted along the path segment corresponding to a node segment ID assigned to the destination node. When no more segment IDs remain in the test-path segment ID stack after removal of the bottom segment ID from the stack ("no" branch of decision step 1008), the process of establishing test-path segment ID stacks ends. Test messages may continue to be sent using the already-established test-path segment ID stacks, however, as noted above.

If method 1000 of FIG. 10 is applied to the test-path segment ID stack shown in FIG. 6B, for example, two test-path segment ID stacks will result: the original stack including node segment IDs 16007 and 16006, and a second stack including only node segment ID 16007 (because 16006 is removed from the bottom of the stack through step 1006 of method 1000). Use of these two test-path segment ID stacks in network 100 of FIG. 1 would allow detection of reroute occurrences between R1 and R7 or between R7 and R6. In order to further localize a reroute occurrence between R1 and R7—to distinguish a failure between R1 and R2 from one between R2 and R7, for example—the starting test-path segment ID stack identified in step 1002 of method 1000 would need to include a node segment for R2 as well. Application of method 1000 to a starting test-path segment ID stack including node segment IDs 16002, 16007 and 16006 would result in three test-path segment ID stacks: the initial stack with node segment IDs 16002, 16007 and 16006, a second stack including node segment IDs 16002 and 16007, and a third stack including only node segment ID 16002. In an embodiment, the initial test-path segment ID stack is chosen to include node segment IDs for each test path segment for which localized reroute detection is desired. Method 1000 is merely one embodiment of a method for establishing test-path segment ID stacks. These segment ID stacks may be established by other methods in other embodiments. In an embodiment, the test-path segment ID stacks are entered manually for storage at a node.

Figure 11:
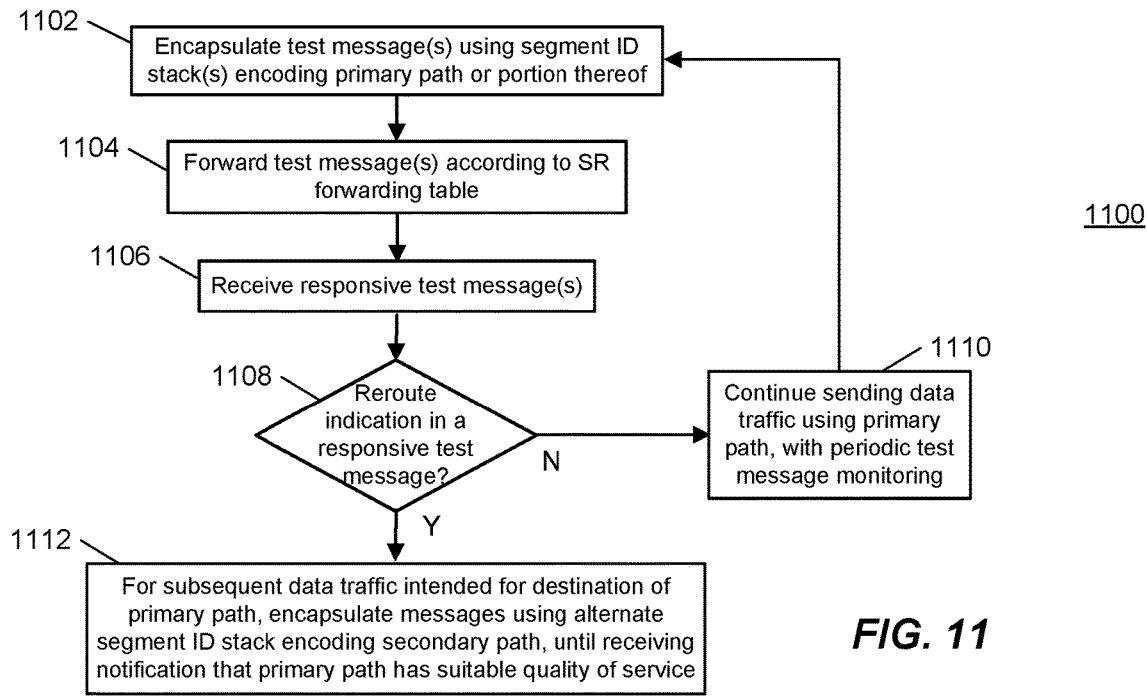
FIG. 11 is a flowchart illustrating an example of a process of managing quality of paths in a network.

The flowchart of FIG. 11 illustrates an embodiment of a method for managing path quality in a network. In an embodiment, method 1100 of FIG. 11 is carried out by an ingress node of a segment routing network. In another embodiment, method 1100 is carried out by a network controller. Method 1100 begins with encapsulating one or more test messages using segment ID stacks encoding a primary path through an SR-enabled network, or a portion of the primary path (step 1102). The test messages, in an embodiment, are BFD messages. In an embodiment, the segment ID stacks for encapsulating the test messages are determined by a method such as method 1000 of FIG. 10. The encapsulated test messages are forwarded, in step 1104, according to entries of an SR forwarding table at a node carrying out method 1100 (or at a node associated with a network controller carrying out the method). In an embodiment, the encapsulation and forwarding of test messages in steps 1102 and 1104 is repeated in a continual fashion during the time that method path quality is being managed.

Method 1100 continues with receiving one or more responsive test messages (step 1106). Assuming that test messages forwarded according to step 1104 are received by their respective destination nodes, responsive test messages sent by those destination nodes are received at the node sending the test messages. If a received responsive test message indicates that a reroute of a test message has occurred ("yes" branch of decision step 1108), subsequent data traffic intended for the primary path is instead encapsulated for transmission along a secondary path through the network (step 1112). This use of the secondary path is continued until notification is received that the primary path can be used with suitable quality of service. In an embodiment, the notification allowing a return to the primary path is received when the network has "converged" such that a new primary path has been calculated and fast reroute is no longer needed. If no reroute indication has been received in a responsive test message ("no" branch of decision step 1108), data traffic is sent using the primary path, with periodic test message monitoring (step 1110). In an embodiment, the periodic test message monitoring involves repeated sending of test messages at short intervals on a continual basis. In a further embodiment, the test message interval is in a range between approximately 100 milliseconds to 200 milliseconds. In other embodiments, the periodic test message monitoring involves sending of test messages at longer intervals, or sessions of repeated sending of messages separated by intervals without sending of test messages. That test message sending is repeated on some schedule is illustrated by the looping of method 1100 from step 1110 back through steps 1102 through 1108.

Figure 12:
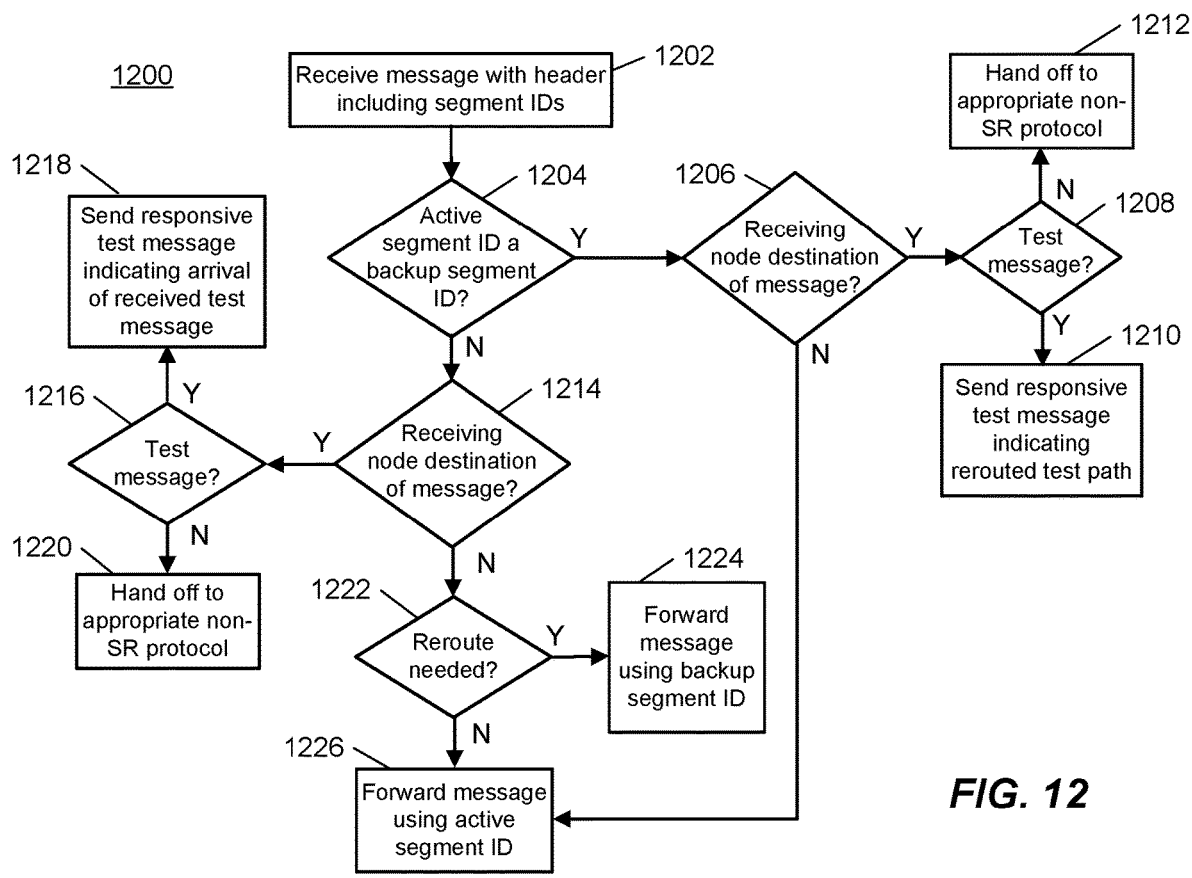
FIG. 12 is a flowchart illustrating an example of a process carried out by a node of a network described herein.

The flowchart of FIG. 12 illustrates an embodiment of a process carried out by a node in an SR-enabled network configured for reroute detection. Examples of the various steps within FIG. 12 are discussed above in connection with FIGS. 6A, 6B and 8. Method 1200 of FIG. 12 begins with receiving a message with segment routing encapsulation—i.e., a message having a header including segment IDs (step 1202). If the active segment ID is a backup segment ID ("yes" branch of decision step 1204), the node receiving the message is the destination node, within the segment routing network, for the message ("yes" branch of decision step 1206), and the message is a test message ("yes" branch of decision step 1208), the node sends a responsive test message indicating a rerouted test path (step 1210). In an embodiment, the message is a BFD message, and the node sends a responsive BFD message. In a further embodiment, the responsive test message includes a BFD diagnostic code indicating that the message was received over a rerouted path. If a message received at its SR destination node is not a test message ("no" branch of decision step 1208), the message is handed off to the appropriate non-SR protocol, depending on the message type (step 1212).

If the receiving node of a message is not the SR destination node for the message ("no" branch of decision step 1206)—for example, if the active segment ID is a node segment ID for a different node, or there are additional non-expired (having TTL>1) segment IDs underlying an active segment ID that the node is instructed to remove—the method continues with forwarding the message using the active segment ID (step 1226). In an embodiment, the message is forwarded according to a segment routing forwarding table at the receiving node. In a further embodiment, forwarding the message using the active segment ID includes using the active segment ID as an index to forwarding instructions in an SR forwarding table. Depending on the SR forwarding instructions at the receiving node, the active segment ID of the forwarded message may be different than the active segment ID of the original received message. The next-hop node receiving the forwarded message, in an embodiment, then handles the message by performing its own instance of method 1200.

If the active segment ID for a received message is not a backup segment ID ("no" branch of decision step 1204), the receiving node is the SR destination node for the message ("yes" branch of decision step 1214), and the message is a test message ("yes" branch of decision step 1216), the node sends a responsive test message indicating arrival of the test message (step 1218). In an embodiment, the message is a BFD message, and the node sends a responsive BFD message. If a message received at its SR destination node is not a test message ("no" branch of decision step 1216), the message is handed off to the appropriate non-SR protocol, depending on the message type (step 1220).

If the active segment ID is not a backup segment ID, the receiving node of a message is not the SR destination node for the message ("no" branch of decision step 1214), and a failure is detected so that fast reroute is needed ("yes" branch of decision step 1222), the message is forwarded using a backup segment ID (step 1224). In an embodiment, the message is forwarded according to a backup entry in a forwarding table such as the tables of FIG. 5A through 5D or 7A through 7D. In a network configured to use a backup node segment ID, the existing node segment ID is replaced with its corresponding backup node segment ID, as described further above in connection with FIGS. 5A through 6B. In a network configured to use a backup context segment ID, the backup context segment ID is pushed onto the segment ID stack of the message below the existing segment ID, as described further above in connection with FIGS. 7A through 8. As illustrated by embodiments using a backup context segment ID, forwarding a message using a backup segment ID does not necessarily mean that the backup segment ID is the active segment ID of the forwarded message. If the active segment ID is not a backup segment ID and fast reroute is not needed, or not available ("no" branch of decision step 1222), the method continues with forwarding the message using the active segment ID (step 1226), as discussed further above. Various modifications and variations of the methods and flowcharts described herein will be apparent to one of ordinary skill in the art in view of this disclosure. For example, certain steps of the methods described herein may be performed in a different order without substantially affecting the outcome of the method.

Figure 13:
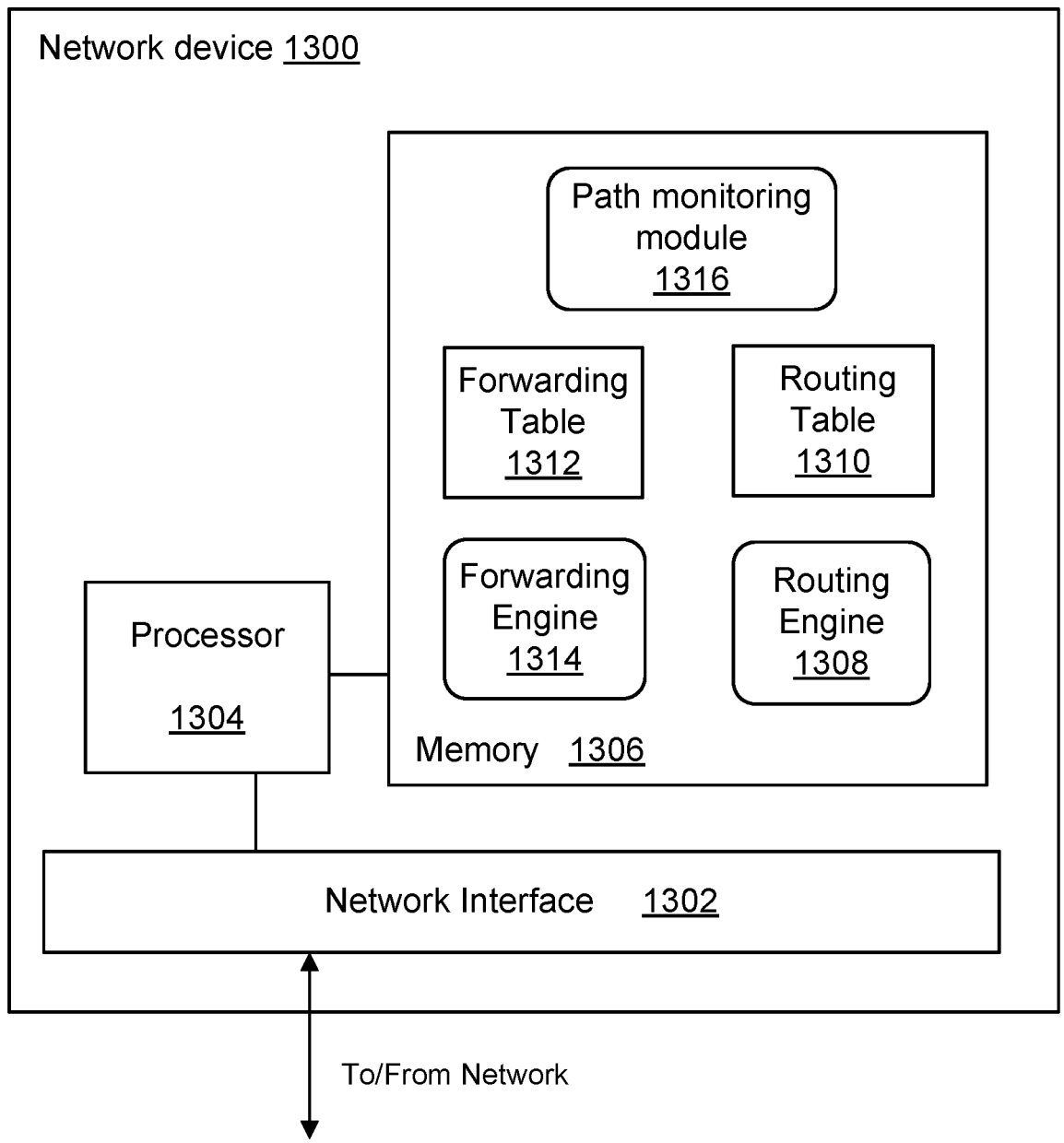
FIG. 13 is a simplified block diagram illustrating certain components of an example network device that can be employed in the networks described herein.

FIG. 13 is a block diagram illustrating certain components of an exemplary network device that may act as, or be associated with, a node in one of the networks described herein. Network device 1300 may, for example, be associated with a router in networks 100, 600, 610 or 800 of FIGS. 1, 2, 6A, 6B and 8. In the embodiment of FIG. 13, network device 1300 includes a network interface 1302, processor 1304 and memory 1306, where memory 1306 stores a routing table 1310 and forwarding table 1312. Memory 1306 further stores program instructions executable by processor 1304 for implementing a routing engine 1308, forwarding engine 1314 and path monitoring module 1316. Network interface 1302 is configured for both sending and receiving both messages and control information, such as IGP advertisements, within a network. In an embodiment, network interface 1302 comprises multiple interfaces and can accommodate multiple communications protocols and control protocols. In an embodiment involving a network controller, network interface 1302 is further configured for communication between the node and a network controller.

Memory 1306 includes a plurality of storage locations addressable by processor 1304 for storing software programs and data structures associated with the methods described herein. As such, memory 1306 may be implemented using any combination of built-in volatile or non-volatile memory, including random-access memory (RAM) and read-only memory (ROM) and integrated or peripheral storage devices such as magnetic disks, optical disks, solid state drives or flash drives. In the embodiment of FIG. 13, memory 1306 stores forwarding engine 1314. Forwarding engine 1314 includes computer executable instructions that when executed by processor 1304 are operable to perform operations such as reading the top segment identifier in a segment ID stack associated with a packet or message, access a forwarding table such as forwarding table 1312 to obtain forwarding instructions for the top segment identifier, and forwarding the packet or message according to the forwarding instructions.

Memory 1306 also stores routing table 1310 and forwarding table 1312 in the embodiment of FIG. 13. In an embodiment, routing table 1310 is an SR routing table, and forwarding table 1312 is an SR forwarding table. In a further embodiment, SR routing table 1310 is a data structure relating segment identifiers to network topology information, such as network nodes and the links between them. In the embodiment of FIG. 13, routing table 1310 is generated by routing engine 1308. In a further embodiment routing engine 1308 includes instructions operable, when executed by processor 1304, for using information received in IGP advertisements sent by other nodes in the network containing network device 1300. In particular, routing engine 1308 may use an IGP link state protocol having SR extensions to construct a topological map of router connectivity in the network and calculate the best paths from network device 1300 to each other router in the network. Routing table 1310 may be within a link state database formed by routing engine 1308 in such an embodiment. Depending on the data plane implementation of an SR network, an SR routing table may also be referred to as a routing information base (RIB) or label information base (LIB).

In an embodiment, forwarding table 1312 is an SR forwarding table relating segment identifiers to respective next hop nodes or egress interfaces for forwarding of a message. In the embodiment of FIG. 13, forwarding table 1312 is generated by routing engine 1308. Depending on the data plane implementation of an SR network, an SR forwarding table may also be referred to as a forwarding information base (FIB) or label forwarding information base (LFIB). Each of routing table 1310 and forwarding table 1312 may alternatively take the form of a database or some other data structure, or may be split into more than one data structure. In an embodiment, routing table 1310 and forwarding table 1312 may be combined into a single database or other data structure at a node.

Memory 1306 further stores path monitoring module 1316. Path monitoring module 1316 includes instructions that when executed by processor 1304 are operable to perform operations including evaluating parameters of a received test message, sending a responsive test message, and including an indicator in a responsive test message that a test message was received over a rerouted path. In an embodiment, path monitoring module 1316 is adapted to receive and send BFD messages. Path monitoring module 1316 is, in an embodiment, adapted to receive from forwarding engine 1314 an indication that a test message arrived at network device 1300 with a backup segment ID as the active segment ID. Embodiments of a network device contemplated herein may include additional components not shown in the embodiment of FIG. 13. For example, network devices associated with nodes at the edge of a segment routing domain may be adapted to use approaches and protocols not involving segment routing in addition to using segment routing. Such a network device may be adapted to use, for example, IP routing or MPLS with LDP in addition to segment routing. In some embodiments, network devices associated with core nodes of a segment routing domain may be adapted to use approaches and protocols not involving segment routing in addition to using segment routing. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program.

Figure 14:
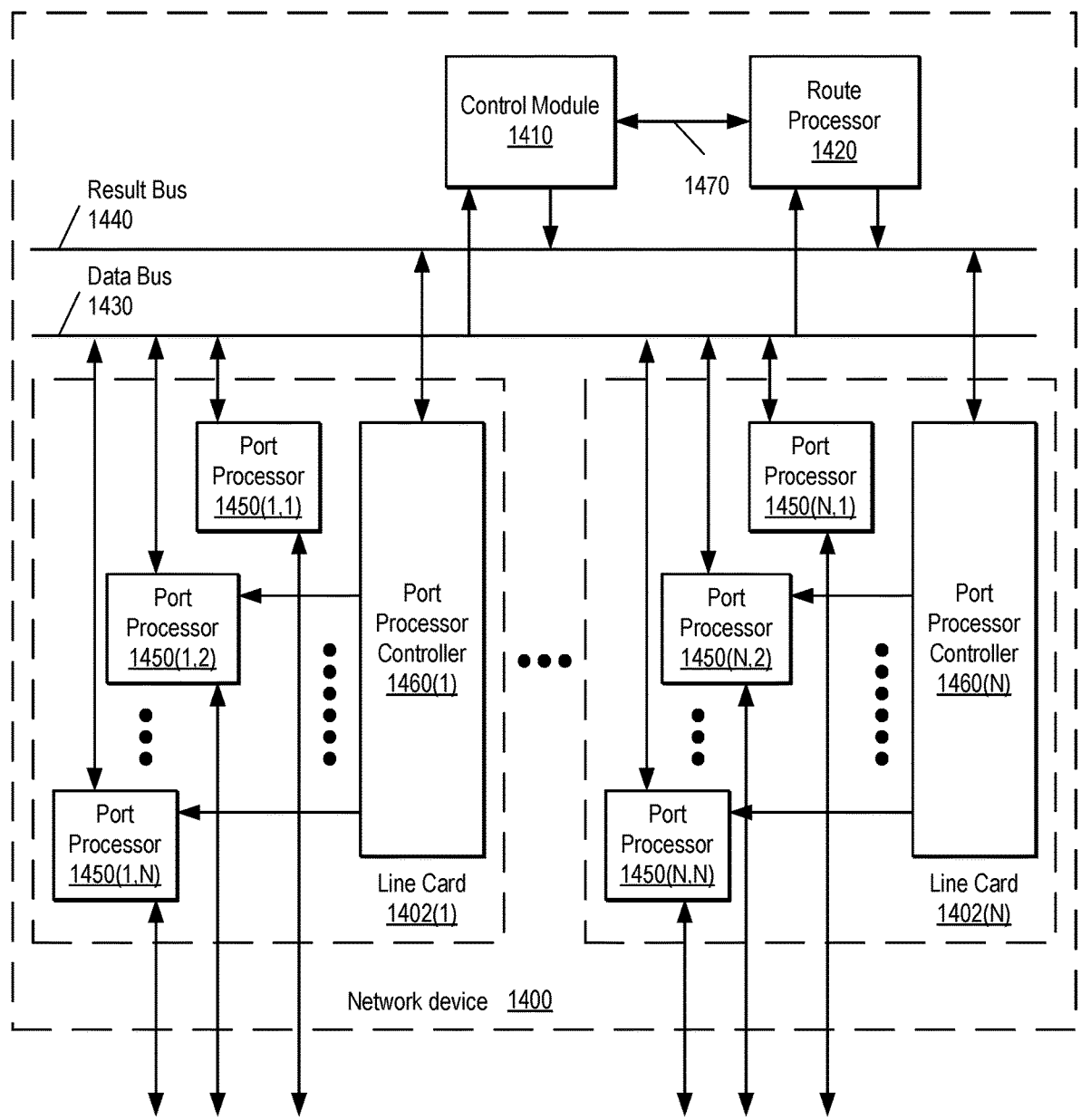
FIG. 14 is a simplified block diagram illustrating certain components of an example network device that can be employed in the networks described herein.

FIG. 14 is a block diagram providing an additional illustration of a network device that may act as, or be associated with, a node in one of the networks described herein. FIG. 14 depicts (at least in part) one configuration of a network device or a network routing element (e.g., a hub, router, switch, or similar device) 1400. In this depiction, network device 1400 includes a number of line cards (line cards 1402(1)-1402(N)) that are communicatively coupled to a control module 1410 and route processor 1420 via a data bus 1430 and result bus 1440. In an embodiment, line cards 1402(1)-1402(N), along with data bus 1430 and result bus 1440, form at least a portion of a network interface such as network interface 1302 of FIG. 13. Control module 1410 may in an embodiment include engines, modules and data structures such as forwarding engine 1314, routing engine 1308, path monitoring module 1316, forwarding table 1312 and routing table 1310 of FIG. 13. Line cards 1402(1)-(N) include a number of port processors 1450(1, 1)-(N, N) which are controlled by port processor controllers 1460(1)-(N). Control module 1410 and processor 1420 are not only coupled to one another via data bus 1430 and result bus 1440, but are also communicatively coupled to one another by a communications link 1470. It is noted that in alternative embodiments, each line card can include its own forwarding engine.

When a message (e.g., a packet) is received at network device 1400, the message may be identified and analyzed in the following manner. Upon receipt, a message (or some or all of its control information) is sent from the one of port processors 1450(1, 1)-(N, N) at which the message was received to one or more of those devices coupled to data bus 1430 (e.g., others of port processors 1450(1, 1)-(N, N), control module 1410 and/or route processor 1420). Handling of the message can be determined, for example, by control module 1410. For example, a forwarding engine within control module 1410 may determine that the message should be forwarded to one or more of port processors 1450(1, 1)-(N, N). This can be accomplished by indicating to corresponding one(s) of port processor controllers 1460(1)-(N) that the copy of the message held in the given one(s) of port processors 1450(1,1)-(N,N) should be forwarded to the appropriate one of port processors 1450(1,1)-(N,N). Network devices described herein, such as network devices 1300 and 1400, include one or more processors such as processor 1304 and route processor 1420, which may take the form of, for example, microprocessors, PLDs (Programmable Logic Devices), or ASICs (Application Specific Integrated Circuits). These processors are configured to execute program instructions stored in computer readable storage media of various types, including RAM (Random Access Memory), ROM (Read Only Memory), Flash memory, MEMS (Micro Electro-Mechanical Systems) memory, and the like.

Figure 15:
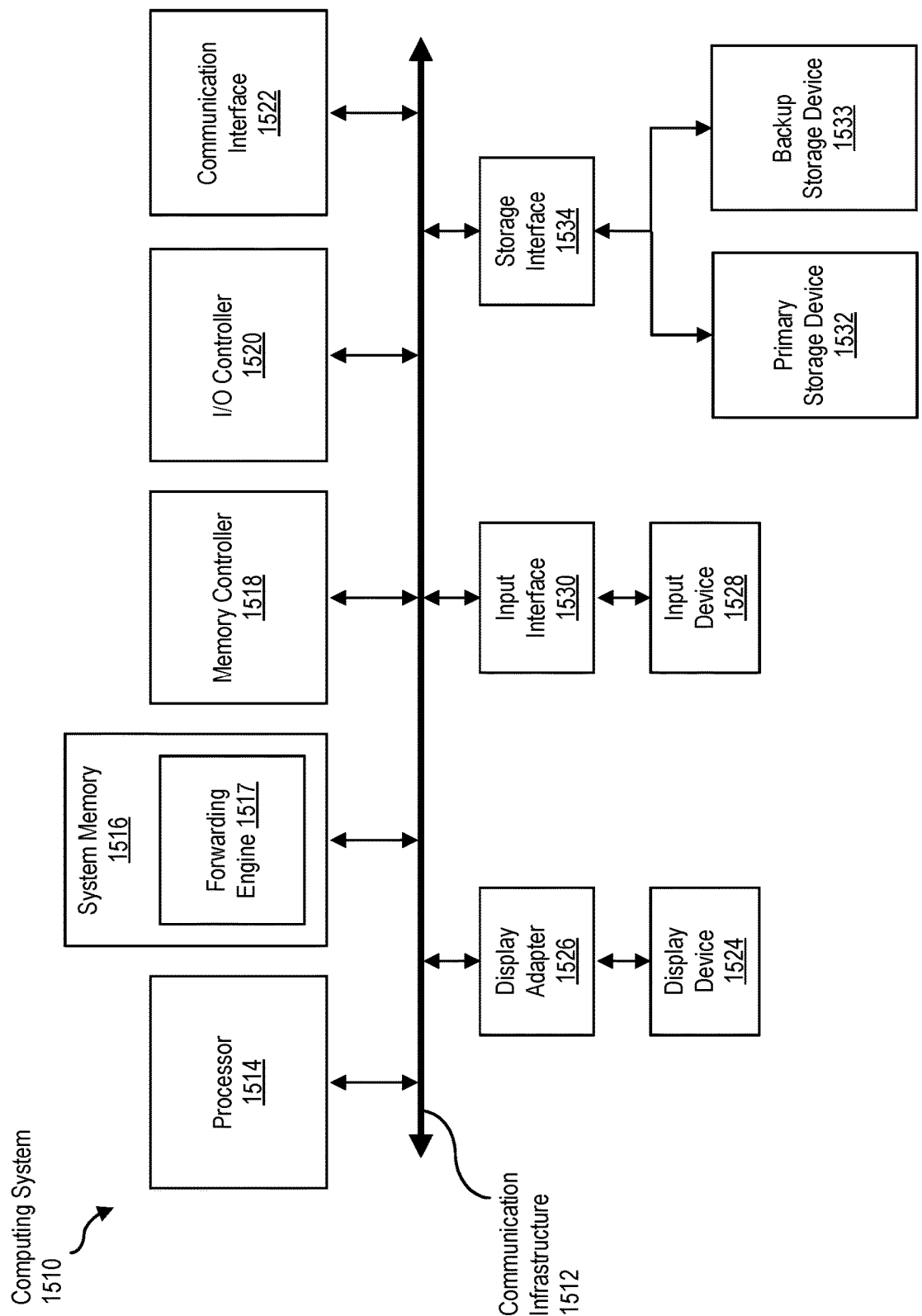
FIG. 15 is a simplified block diagram depicting a computer system suitable for implementing embodiments of the devices and systems described herein.

FIG. 15 depicts a block diagram of a computing system 1510 suitable for implementing aspects of the systems described herein. In the embodiment of FIG. 15, computing system 1510 implements a forwarding engine 1517. Embodiments of the computing system of FIG. 15 can, alternatively or in addition, implement various other engines and modules described in this disclosure. Computing system 1510 broadly represents any single or multi-processor computing device or system capable of executing computer-readable instructions. Examples of computing system 1510 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1510 may include at least one processor 1514 and a system memory 1516. By executing the software that implements a forwarding engine 1517, computing system 1510 becomes a special purpose computing device that is configured to perform message forwarding in manners described elsewhere in this disclosure.

Processor 1514 generally represents any type or form of processing unit capable of processing data or interpreting and executing instructions. In certain embodiments, processor 1514 may receive instructions from a software application or module. These instructions may cause processor 1514 to perform the functions of one or more of the embodiments described and/or illustrated herein. System memory 1516 generally represents any type or form of volatile or non-volatile storage device or medium capable of storing data and/or other computer-readable instructions. Examples of system memory 1516 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 1510 may include both a volatile memory unit (such as, for example, system memory 1516) and a non-volatile storage device (such as, for example, primary storage device 1532, as described further below). In one example, program instructions executable to implement a forwarding engine configured to forward messages using segment routing may be loaded into system memory 1516.

In certain embodiments, computing system 1510 may also include one or more components or elements in addition to processor 1514 and system memory 1516. For example, as illustrated in FIG. 15, computing system 1510 may include a memory controller 1518, an Input/Output (I/O) controller 1520, and a communication interface 1522, each of which may be interconnected via a communication infrastructure 1512. Communication infrastructure 1512 generally represents any type or form of infrastructure capable of facilitating communication between one or more components of a computing device. Examples of communication infrastructure 1512 include, without limitation, a communication bus (such as an Industry Standard Architecture (ISA), Peripheral Component Interconnect (PCI), PCI express (PCIe), or similar bus) and a network.

Memory controller 1518 generally represents any type or form of device capable of handling memory or data or controlling communication between one or more components of computing system 1510. For example, in certain embodiments memory controller 1518 may control communication between processor 1514, system memory 1516, and I/O controller 1520 via communication infrastructure 1512. In certain embodiments, memory controller 1518 may perform and/or be a means for performing, either alone or in combination with other elements, one or more of the operations or features described and/or illustrated herein. I/O controller 1520 generally represents any type or form of module capable of coordinating and/or controlling the input and output functions of a computing device. For example, in certain embodiments I/O controller 1520 may control or facilitate transfer of data between one or more elements of computing system 1510, such as processor 1514, system memory 1516, communication interface 1522, display adapter 1526, input interface 1530, and storage interface 1534.

Communication interface 1522 broadly represents any type or form of communication device or adapter capable of facilitating communication between computing system 1510 and one or more additional devices. For example, in certain embodiments communication interface 1522 may facilitate communication between computing system 1510 and a private or public network including additional computing systems. Examples of communication interface 1522 include, without limitation, a wired network interface (such as a network interface card), a wireless network interface (such as a wireless network interface card), a modem, and any other suitable interface. In at least one embodiment, communication interface 1522 may provide a direct connection to a remote server via a direct link to a network, such as the Internet. Communication interface 1522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1522 may also represent a host adapter configured to facilitate communication between computing system 1510 and one or more additional network or storage devices via an external bus or communications channel Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 1522 may also allow computing system 1510 to engage in distributed or remote computing. For example, communication interface 1522 may receive instructions from a remote device or send instructions to a remote device for execution.

As illustrated in FIG. 15, computing system 1510 may also include at least one display device 1524 coupled to communication infrastructure 1512 via a display adapter 1526. Display device 1524 generally represents any type or form of device capable of visually displaying information forwarded by display adapter 1526. Similarly, display adapter 1526 generally represents any type or form of device configured to forward graphics, text, and other data from communication infrastructure 1512 (or from a frame buffer) for display on display device 1524. Computing system 1510 may also include at least one input device 1528 coupled to communication infrastructure 1512 via an input interface 1530. Input device 1528 generally represents any type or form of input device capable of providing input, either computer or human generated, to computing system 1510. Examples of input device 1528 include, without limitation, a keyboard, a pointing device, a speech recognition device, or any other input device.

As illustrated in FIG. 15, computing system 1510 may also include a primary storage device 1532 and a backup storage device 1533 coupled to communication infrastructure 1512 via a storage interface 1534. Storage devices 1532 and 1533 generally represent any type or form of storage device or medium capable of storing data and/or other computer-readable instructions. For example, storage devices 1532 and 1533 may be a magnetic disk drive (e.g., a so-called hard drive), a floppy disk drive, a magnetic tape drive, an optical disk drive, a flash drive, or the like. Storage interface 1534 generally represents any type or form of interface or device for transferring data between storage devices 1532 and 1533 and other components of computing system 1510. A storage device like primary storage device 1532 can store information such as routing tables and forwarding tables.

In certain embodiments, storage devices 1532 and 1533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1532 and 1533 may also include other similar structures or devices for allowing computer software, data, or other computer-readable instructions to be loaded into computing system 1510. For example, storage devices 1532 and 1533 may be configured to read and write software, data, or other computer-readable information. Storage devices 1532 and 1533 may be a part of computing system 1510 or may in some embodiments be separate devices accessed through other interface systems. Many other devices or subsystems may be connected to computing system 1510. Conversely, all of the components and devices illustrated in FIG. 15 need not be present to practice the embodiments described and/or illustrated herein. The devices and subsystems referenced above may also be interconnected in different ways from that shown in FIG. 15.

Computing system 1510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1510 for storage in memory via a network such as the Internet or upon a carrier medium. The computer-readable medium containing the computer program may be loaded into computing system 1510. All or a portion of the computer program stored on the computer-readable medium may then be stored in system memory 1516 and/or various portions of storage devices 1532 and 1533. When executed by processor 1514, a computer program loaded into computing system 1510 may cause processor 1514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1510 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
receiving, at a first node in a segment routing domain of a communications network, a test message comprising a header, wherein
the first node is not an ingress node, to the segment routing domain, for the test message,
the header comprises a segment identifier stack comprising one or more segment identifiers, and
the segment routing domain is configured to use the segment identifier stack for routing the test message;
detecting a first indicator of a reroute requirement for the test message; and
sending an outgoing message to a second node determined using the header, wherein
sending the outgoing message comprises including in the outgoing message a second indicator indicating that the test message has been rerouted,
at least one of the first indicator or the second indicator comprises a single backup-path segment identifier introduced into the segment identifier stack during the course of a reroute of the test message,
the single backup-path segment identifier indicates, at a destination node for the test message, that the test message has been rerouted, and
the backup-path segment identifier comprises a segment identifier assigned uniquely to a particular node in the segment routing domain and introduced in place of a primary-path segment identifier assigned to the particular node, or
the backup-path segment identifier comprises a segment identifier used as a backup-path indicator by multiple nodes in the segment routing domain and introduced in addition to a primary-path segment identifier assigned to a particular node in the segment routing domain.

2. The method of claim 1, wherein
the first indicator comprises a notification that a link in an original test path for the test message has failed; and
the second indicator comprises the backup-path segment identifier.

3. The method of claim 2, wherein sending the outgoing message further comprises accessing, in a segment routing forwarding table, a backup entry for bypassing the failed link.

4. The method of claim 1, wherein
the first indicator comprises an incoming backup-path segment identifier among the one or more segment identifiers; and
the second indicator comprises an outgoing backup-path segment identifier.

5. The method of claim 4, wherein sending the outgoing message further comprises accessing a forwarding table entry for an active segment identifier among the one or more segment identifiers.

6. The method of claim 4, wherein
the incoming backup-path segment identifier comprises an active segment identifier among the one or more segment identifiers; and
including in the outgoing message the second indicator comprises using the outgoing backup-path segment identifier in place of the incoming backup-path segment identifier.

7. The method of claim 4, wherein the one or more segment identifiers comprise an active segment identifier other than the incoming backup-path segment identifier.

8. The method of claim 1, wherein
the first indicator comprises an incoming backup-path segment identifier among the one or more segment identifiers;
the outgoing message comprises a responsive test message; and
the second indicator comprises a code in the responsive test message.

9. The method of claim 8, wherein
the test message comprises a bidirectional forwarding detection (BFD) message;
the outgoing message further comprises a responsive BFD message; and
the second indicator further comprises a diagnostic code in the responsive BFD message.

10. The method of claim 1, wherein one or more nodes in the segment routing domain are configured to detect, by virtue of the presence of the backup-path segment identifier in the segment identifier stack, that the test message has been rerouted.

11. The method of claim 1, wherein the backup-path segment identifier is retrieved from a segment routing forwarding table during the course of the reroute of the test message.

12. A system for implementing a first node in a segment routing domain of a communications network, the system comprising:
a network interface adapted for data communication with one or more additional nodes of the segment routing domain; and
a processor operably coupled to the network interface and adapted to
receive a test message comprising a header, wherein
the first node is not an ingress node, to the segment routing domain, for the test message,
the header comprises a segment identifier stack comprising one or more segment identifiers, and
the segment routing domain is configured to use the segment identifier stack for routing the test message,
detect a first indicator of a reroute requirement for the test message,
include in an outgoing message a second indicator indicating that the test message has been rerouted, and
send the outgoing message to a node determined using the header, wherein
at least one of the first indicator or the second indicator comprises a single backup-path segment identifier introduced into the segment identifier stack during the course of a reroute of the test message,
the single backup-path segment identifier indicates, at a destination node for the test message, that the test message has been rerouted, and
the backup-path segment identifier comprises a segment identifier assigned uniquely to a particular node in the segment routing domain and introduced in place of a primary-path segment identifier assigned to the particular node, or
the backup-path segment identifier comprises a segment identifier used as a backup-path indicator by multiple nodes in the segment routing domain and introduced in addition to a primary-path segment identifier assigned to a particular node in the segment routing domain.

13. The system of claim 12, further comprising a memory operably coupled to the processor, wherein the memory is adapted to store a segment routing forwarding table comprising at least one of the one or more segment identifiers.

14. The system of claim 13, wherein
the first indicator comprises a notification that a link in an original test path for the test message has failed; and
the second indicator comprises the backup-path segment identifier.

15. The system of claim 14, wherein the processor is further adapted to access the segment routing forwarding table to obtain the backup-path segment identifier.

16. The system of claim 13, wherein
the first indicator comprises an incoming backup-path segment identifier among the one or more segment identifiers; and
the second indicator comprises an outgoing backup-path segment identifier.

17. The system of claim 16, wherein the processor is further adapted to
access an entry in the segment routing forwarding table for an active segment identifier among the one or more segment identifiers, and
obtain the outgoing backup-path segment identifier from the accessed entry.

18. The system of claim 12, wherein
the first indicator comprises an incoming backup-path segment identifier among the one or more segment identifiers;
the outgoing message comprises a responsive test message; and
the second indicator comprises a code in the responsive test message.

19. The system of claim 18, wherein
the test message comprises a bidirectional forwarding detection (BFD) message;
the outgoing message further comprises a responsive BFD message; and
the second indicator further comprises a diagnostic code in the responsive BFD message.

* * * * *